US012812536B2

(12) United States Patent
Vincenzoni

(10) Patent No.: US 12,812,536 B2
(45) Date of Patent: Nov. 24, 2026

(54) LOW FREQUENCY WAKE-UP DETECTION CIRCUITRY

(71) Applicant: STMicroelectronics International N.V., Geneva (CH)

(72) Inventor: David Vincenzoni, Arcore (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 218 days.

(21) Appl. No.: 18/644,628

(22) Filed: Apr. 24, 2024

(65) Prior Publication Data

US 2025/0338211 A1 Oct. 30, 2025

(51) Int. Cl.
*H04W 52/02* (2009.01)
*H04L 7/00* (2006.01)

(52) U.S. Cl.
CPC ....... *H04W 52/0229* (2013.01); *H04L 7/0087* (2013.01)

(58) Field of Classification Search
CPC .......... H04W 52/0229; H04W 52/0287; H04L 7/0087
See application file for complete search history.

(56) References Cited

U.S. PATENT DOCUMENTS

| | | | | |
|---|---|---|---|---|
| 2011/0080367 | A1 | 4/2011 | Marchand et al. | |
| 2014/0351615 | A1 | 11/2014 | Gupta et al. | |
| 2017/0242709 | A1 | 8/2017 | Bodner et al. | |
| 2018/0159634 | A1 | 6/2018 | Lo | |
| 2021/0055963 | A1 | 2/2021 | An et al. | |
| 2023/0218206 | A1 | 7/2023 | Halac et al. | |
| 2023/0412160 | A1* | 12/2023 | Vincenzoni | H03K 3/0315 |

* cited by examiner

*Primary Examiner* — Diane D Mizrahi
(74) *Attorney, Agent, or Firm* — Alston & Bird LLP

(57) ABSTRACT

Example wake-up detection circuitry, wireless communication receivers, and methods for detecting a wake-up pulse pattern in a received data signal are provided. The wake-up pulse pattern transmitted at a transmission rate and including a wake-up pulse sequence repeated according to a repeat sequence period. The example wake-up detection circuitry includes wake-up pulse count searching circuitry and wake-up pattern compare circuitry each coupled to a low-frequency clock oscillating at a frequency lower than the transmission rate. The wake-up pulse count searching circuitry configured to determine a pulse count accumulation from the received data signal corresponding to an accumulation of sequential pulse counts transmitted in the received data signal during a low-frequency clock oscillation period of the low-frequency clock. The wake-up pattern compare circuitry configured to detect the wake-up pulse sequence based at least in part on a pulse count accumulation pattern corresponding to a plurality of sequential pulse count accumulations.

20 Claims, 14 Drawing Sheets

LOW FREQUENCY WAKE-UP DETECTION CIRCUITRY

TECHNOLOGICAL FIELD

Embodiments of the present disclosure relate generally to wake-up detection circuitry, and more particularly, to low power, robust wake-up detection circuitry.

BACKGROUND

Many wireless communication devices operating on battery or environmental power, such as laptops, mobile phones, tablets, appliances, cameras, internet of things devices, and so on may operate within strict power consumption limitations. Such wireless communication devices may be configured to utilize numerous techniques to reduce power consumption. For example, wireless communication devices often enter a low-power or sleep state when not actively operating and/or communicating with another device. These wireless communication devices may utilize communication mechanisms, such as special wake-up signals, to wake-up from a low-power or sleep state in an instance in which data is incoming or an action request is sent.

Applicant has identified many technical challenges and difficulties associated with detecting special wake-up signals in a low-power or sleep state. Through applied effort, ingenuity, and innovation, Applicant has solved problems related to the detection of special wake-up signals by developing solutions embodied in the present disclosure, which are described in detail below.

BRIEF SUMMARY

Various embodiments are directed to example wake-up detection circuitry, wireless communication receivers, and methods for detecting a wake-up pulse pattern in a received data signal. Example wake-up detection circuitry is provided. In some embodiments, the example wake-up detection circuitry is configured to detect a wake-up pulse pattern in a received data signal, the wake-up pulse pattern comprising a wake-up pulse sequence repeated according to a repeat sequence period and transmitted at a transmission rate. The wake-up detection circuitry includes wake-up pattern detection circuitry, comprising wake-up pulse count searching circuitry coupled to a low-frequency clock wherein an oscillating frequency of the low-frequency clock is lower than the transmission rate. The wake-up pulse count searching circuitry is configured to receive the received data signal and determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock. The wake-up pattern detection circuitry further comprising wake-up pattern compare circuitry coupled to the low-frequency clock, wherein the wake-up pattern compare circuitry is configured to detect the wake-up pulse sequence based at least in part on a pulse count accumulation pattern corresponding to a plurality of sequential pulse count accumulations.

In some embodiments, the wake-up detection circuitry further comprises parallel run detection circuitry configured to receive a wake-up sequence match signal indicating a first wake-up pulse sequence has been detected by the wake-up pattern detection circuitry and initiate a first parallel run. In some embodiments, initiating a first parallel run comprises determining a next search period corresponding to the repeat sequence period and in an instance in which a second wake-up pulse sequence is received during the next search period, causing a wake-up signal match to be transmitted, otherwise, causing the first parallel run to be invalidated.

In some embodiments, in an instance in which the first parallel run is initiated, and a potential wake-up sequence match is received outside of the next search period, a second parallel run is initiated.

In some embodiments, the wake-up detection circuitry further comprises a wake-up periodicity detection finite state machine, wherein the wake-up periodicity detection finite state machine is configured to transmit the wake-up signal match in an instance in which the wake-up pulse pattern is detected.

In some embodiments, the wake-up detection circuitry further comprises a parallel run scheduler, wherein the parallel run scheduler is configured to receive a parallel run enable signal from the wake-up periodicity detection finite state machine; determine a number of parallel runs available; and transmit a parallel run scheduling request based on the number of parallel runs available.

In some embodiments, the wake-up detection circuitry further comprises base period circuitry, wherein the base period circuitry is configured to determine a repeat sequence count correlating a number of periods of the low-frequency clock to the repeat sequence period.

In some embodiments, a maximum number of parallel runs corresponds to the repeat sequence count.

In some embodiments, the pulse count accumulation pattern corresponds to three or more sequential pulse count accumulations comprising at least: a first sequential pulse count accumulation, a second sequential pulse count accumulation, and a third sequential pulse count accumulation, wherein the pulse count accumulation pattern comprises an approximately normal distribution.

In some embodiments, the wake-up pulse count searching circuitry further comprises pulse count circuitry configured to: receive the received data signal; and count a number of pulses in the received data signal.

In some embodiments, the pulse count circuitry comprises a gray counter.

In some embodiments, the wake-up pulse count searching circuitry further comprises count resync circuitry, configured to: receive the low-frequency clock, wherein the low-frequency clock oscillates according to the low-frequency oscillation period; and determine at each low-frequency oscillation period, a resync count corresponding to the count of the number of pulses in the received data signal during the low-frequency oscillation period.

In some embodiments, the wake-up pulse count searching circuitry further comprises count conversion circuitry, configured to convert the resync count into a binary-coded decimal value.

In some embodiments, the plurality of sequential pulse counts comprises a sequential pulse count quantity, wherein the sequential pulse count quantity is determined based on a pulse period corresponding to a duration of the wake-up pulse sequence.

In some embodiments, the sequential pulse count quantity is determined by dividing the pulse period by the low-frequency oscillation period, wherein the low-frequency clock oscillates according to the low-frequency oscillation period.

An example wireless communication receiver is further provided. In some embodiments, the example wireless communication receiver is configured to detect a wake-up pulse pattern in a received data signal, the wake-up pulse pattern comprising a wake-up pulse sequence repeated according to a repeat sequence period and transmitted at a transmission rate, the wireless communication receiver comprising wake-up detection circuitry including wake-up pattern detection circuitry. In some embodiments, the wake-up pattern detection circuitry, comprises wake-up pulse count searching circuitry and wake-up pattern compare circuitry coupled to a low-frequency clock wherein an oscillating frequency of the low-frequency clock is lower than the transmission rate. In some embodiments, the wake-up pulse count searching circuitry is configured to receive the received data signal and determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock. In some embodiments, the wake-up pattern compare circuitry is configured to detect the wake-up pulse sequence based at least in part on a pulse count accumulation pattern corresponding to a plurality of sequential pulse count accumulations.

In some embodiments, the wireless communication receiver is configured to enter a low-power mode, wherein the wake-up detection circuitry is enabled in an instance in which the wireless communication receiver enters the low-power mode.

In some embodiments, the wake-up detection circuitry causes the wireless communication receiver to exit the low-power mode, in an instance in which the wake-up detection circuitry detects the wake-up pulse pattern.

In some embodiments, the wireless communication receiver further comprises parallel run detection circuitry configured to receive a wake-up sequence match signal indicating a first wake-up pulse sequence has been detected by the wake-up pattern detection circuitry; and initiate a first parallel run. In some embodiments, initiating the first parallel run comprises determining a next search period corresponding to the repeat sequence period; and in an instance in which a second wake-up pulse sequence is received during the next search period, causing a wake-up signal match to be transmitted, otherwise, causing the first parallel run to be invalidated.

An example method for detecting a wake-up pulse pattern in a received data signal, the wake-up pulse pattern comprising a wake-up pulse sequence repeated according to a repeat sequence period and transmitted at a transmission rate, is further provided. In some embodiments, the example method comprises receiving, at wake-up detection circuitry, the received data signal, wherein the wake-up detection circuitry is coupled to a low-frequency clock, and wherein an oscillating frequency of the low-frequency clock is lower than the transmission rate. In some embodiments, the method further comprises determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock. In some embodiments, the method further comprises detecting the wake-up pulse sequence based at least in part on a pulse count accumulation pattern corresponding to a plurality of sequential pulse count accumulations.

In some embodiments, the method may further comprise initiating a first parallel run upon detection of a first wake-up pulse sequence, wherein initiating the first parallel run comprises determining a next search period corresponding to the repeat sequence period; and in an instance in which a second wake-up pulse sequence is received during the next search period, causing a wake-up signal match to be transmitted. The method further comprising initiating a second parallel run in an instance in which the first parallel run is initiated, and a potential wake-up sequence match is received outside of the next search period.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
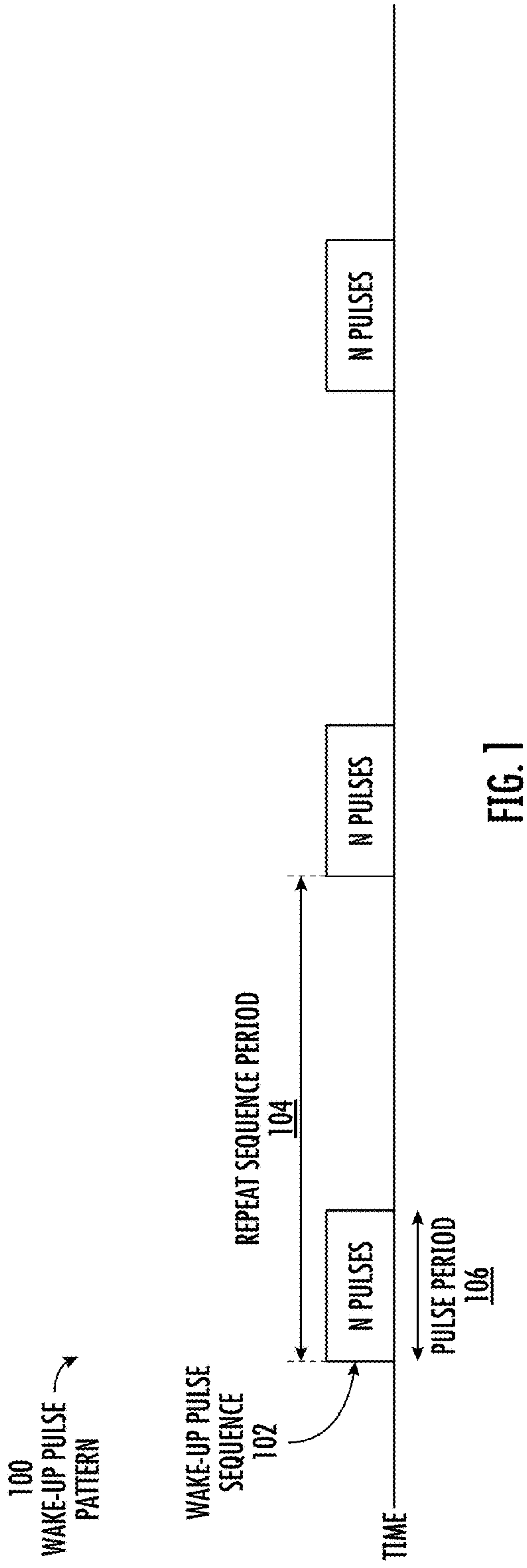
FIG. 1 illustrates an example wake-up pulse pattern in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with detecting a wake-up pulse pattern in a received data signal. As understood by those of skill in the field to which the present disclosure pertains, there are numerous example scenarios in which a user may desire to detect a wake-up pulse pattern in a received data signal, for example, to facilitate the transfer of data between wireless communication devices and/or initiate an action on a wireless communication device.

Wireless communication on electronic devices has become an integral part of our daily lives. Wireless communication enables electronic devices to communicate data, receive and perform actions, provide status, and so on. Wireless communication is particularly important to the operation of mobile communication devices operating on battery or environmental power, such as laptops, mobile phones, tablets, appliances, cameras, internet of things devices, and so on. However, wireless communication may utilize large amounts of power in transmitting data, receiving data, and/or searching for data signals from nearby electronic devices. Supporting wireless communication on an electronic device may have a dramatic effect on the power consumption of an electronic device.

Such electronic devices may be configured to utilize numerous techniques to reduce power consumption. For example, electronic devices supporting wireless communication often enter a low-power or sleep state when not actively operating and/or communicating with another electronic device. These electronic devices may utilize communication mechanisms, such as wake-up signals comprising wake-up pulse patterns, to wake-up from a low-power or sleep state in an instance in which data is incoming or an action request is sent.

When an electronic device supporting wireless communication is operating in a low-power or sleep state, a receiver on the electronic device may be configured to detect the wake-up pulse pattern in a received data signal and wake-up the systems and processes of the electronic device in an instance in which the wake-up pulse pattern is detected. As the receiver is configured to run continuously, a receiver configured to utilize minimal power may prolong the battery life of the electronic device.

One major source of power consumption in a receiver, is the generation and use of a high-speed clock by the electrical components of the receiver. As such, reducing the frequency of the high-speed clock while maintaining accuracy, may be desirable.

In addition, an electronic device supporting wireless communication may be deployed in a noisy environment. An electronic device in a noisy environment may receive radio transmissions from various sources. Any radio transmissions received at the electronic device, not intended for the electronic device, may be classified as noise. An electronic device may be configured to be robust to such noise, for example, by recognizing a wake-up pulse pattern in a noisy environment.

The various example embodiments described herein utilize various techniques to detect a wake-up pulse pattern in a noisy environment while limiting the amount of power consumed by the wake-up detection circuitry, particularly during a low-power state. For example, in some embodiments, the wake-up detection circuitry may utilize a low-frequency clock operating at a lower frequency than the transmission rate of the baseline received data signal. The lower clock rate enables the wake-up detection circuitry to consume less power during operation compared to a clock at or near the transmission rate of the received data signal.

In order to recognize the wake-up pulse sequence within a wake-up pulse pattern, the wake-up detection circuitry may be configured to count the number of pulses received in the received data signal during a period of the low-frequency clock. The wake-up detection circuitry may be further configured to accumulate the number of pulses in the received data signal based on the duration of the pulse period in which the wake-up pulse sequence is configured to be transmitted. By accumulating the number of pulses of sequential low-frequency clock periods, a pulse count accumulation pattern may be determined. Utilizing the pulse count accumulation pattern, the wake-up detection circuitry may detect the wake-up pulse sequence, for example, by comparing the pulse count accumulation pattern to a normal distribution.

In addition to recognizing the wake-up pulse sequence of the wake-up pulse pattern, the wake-up detection circuitry may be configured to detect the periodic repetition of the wake-up pulse sequence in the wake-up pulse pattern. For example, the wake-up detection circuitry may include a wake-up periodicity detection finite state machine (FSM) configured to detect the periodic transmissions of the wake-up pulse sequence, confirming the initial wake-up pulse sequence of the wake-up pulse pattern.

The wake-up detection circuitry may further include parallel run detection circuitry. The parallel run detection circuitry may be configured to receive indication of multiple wake-up pulse sequences each wake-up pulse sequence potentially comprising a wake-up pulse pattern. The parallel run detection circuitry may be configured to initiate multiple parallel runs, each run to be checked for compliance with the wake-up pulse pattern. By utilizing multiple parallel runs in the wake-up detection circuitry, the wake-up detection circuitry may be robust to false matches with radio noise received at the electronic device.

As a result of the herein described example embodiments and in some examples, the effectiveness of a receiver configured to detect a wake-up pulse pattern in a received data signal while conserving power may be greatly improved. In addition, the receiver may be robust to environment noise in the detection of a wake-up pulse pattern.

Referring now to FIG. 1, an example wake-up pulse pattern 100 is provided. As depicted in FIG. 1, the example wake-up pulse pattern 100 is formed by the repetition of a wake-up pulse sequence 102 repeated according to a repeat sequence period 104. Each wake-up pulse sequence 102 of the wake-up pulse pattern 100 comprises N pulses transmitted during a pulse period 106.

Figure 2:
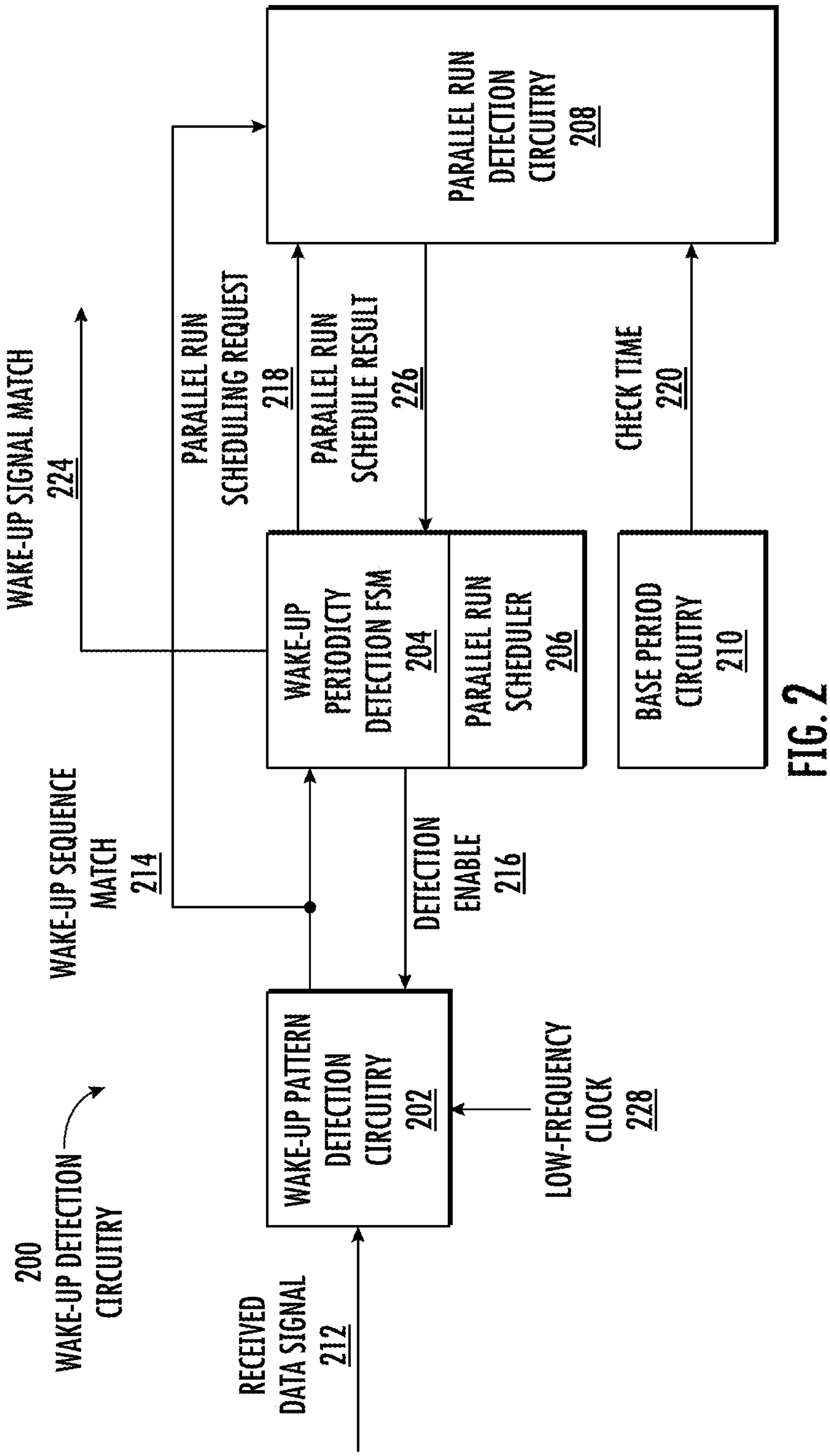
FIG. 2 illustrates an example block diagram of wake-up detection circuitry in accordance with an example embodiment of the present disclosure.

As depicted in FIG. 1, a wake-up pulse pattern 100 is any distinct pattern configured to notify a wireless communication receiver in a low-power or sleep state of an incoming electrical signal (e.g., received data signal 212 described in relation to FIG. 2). The received data signal comprising the wake-up pulse pattern 100 is transmitted at a transmission rate established by the transmission protocol. The received data signal, for example, may be configured to comply with various wireless communication protocols, including but not limited to Wi-Fi®, Li-Fi, Bluetooth®, Bluetooth® Low Energy (BLE), Zigbee®, near-field communication (NFC), Telepass®, CEN/TC 278, Z-Wave®, narrow band internet of things (NB-IoT), radio frequency identification system (RFID), IPv6 over low power personal area network (6LoWPAN), long range wide area network (LoRaWAN), cellular bands, and so on. Each of these wireless communication protocols establish a standard transmission rate (e.g., frequency). For example, received data signals transmitted in accordance with established wireless communication protocols may be transmitted with a transmission rate as low as a few hertz or up to tens of gigahertz.

As further depicted in FIG. 1, the wake-up pulse pattern 100 comprises a wake-up pulse sequence 102 including a known number (e.g., N) of pulses transmitted within a pulse period 106. The pulse period 106 is the period of time established by the transmission protocol in which the N pulses may be transmitted. A transmission protocol may dictate the length of the pulse period. The known number of pulses may also be established by the transmission protocol. As a non-limiting example, a transmission protocol may establish that a wake-up pulse sequence 102 may transmit 7 pulses in a pulse period 106 of 60 microseconds.

As further depicted in FIG. 1, the wake-up pulse pattern 100 is further formed by repeating the wake-up pulse sequence 102 a known number (e.g., M) of times established by the transmission protocol. The wake-up pulse sequence 102 is repeated according to a repeat sequence period 104. The repeat sequence period 104 is the period of time established by the transmission protocol after which the wake-up pulse sequence is repeated. Thus, recognizing a wake-up pulse pattern 100 includes recognizing the wake-up pulse sequence 102 comprising N pulses within a pulse period 106. Recognizing the wake-up pulse pattern 100 further includes recognizing the repetition of the wake-up pulse sequence 102 M times according to a repeat sequence period 104.

Referring now to FIG. 2, example wake-up detection circuitry 200 is provided. As depicted in FIG. 2, the example wake-up detection circuitry 200 includes wake-up pattern detection circuitry 202 configured to receive a received data signal 212 comprising a wake-up pulse pattern and generate a wake-up sequence match signal 214. The wake-up detection circuitry 200 further includes parallel run detection circuitry 208 configured to receive a parallel run schedule result signal 226 from the wake-up periodicity detection FSM 204 comprising a parallel run scheduler 206, based at least in part on the wake-up sequence match signal 214. The wake-up periodicity detection FSM 204 is further configured to generate a wake-up signal match signal 224 based on the parallel run schedule result signal 226 generated by the parallel run detection circuitry 208. The wake-up periodicity detection FSM 204 further generates and transmits a detection enable signal 216 to the wake-up pattern detection circuitry 202. As further depicted in FIG. 2, the wake-up detection circuitry 200 includes base period circuitry 210 configured to generate a check time signal 220 to the parallel run detection circuitry 208.

As depicted in FIG. 2, the example wake-up detection circuitry 200 includes wake-up pattern detection circuitry 202. Wake-up pattern detection circuitry 202 is any circuitry comprising hardware and/or software configured to receive a received data signal 212 and detect a wake-up pulse sequence (e.g., wake-up pulse sequence 102) portion of a wake-up pulse pattern 100. Upon detection of the wake-up pulse sequence, the wake-up pattern detection circuitry 202 is configured to generate a wake-up sequence match signal 214.

A received data signal 212 is any sequence of one or more electromagnetic waves generated by a wireless communication device and transmitted across a transmission medium. A received data signal 212 is configured and/or modulated to encode data. The received data signal is modulated with encoded data in order to communicate data to one or more intended wireless communication receivers. A received data signal 212 may comprise electromagnetic radio frequency (RF) waves. In some embodiments, a received data signal may comprise optical waves.

The received data signal 212 is configured to comply with various wireless communication protocols, including but not limited to Wi-Fi®, Li-Fi, Bluetooth®, Bluetooth® Low Energy (BLE), Zigbee, near-field communication (NFC), Telepass®, CEN/TC 278, Z-Wave®, narrow band internet of things (NB-IoT), radio frequency identification system (RFID), IPv6 over low power personal area network (6LoWPAN), long range wide area network (LoRaWAN), cellular bands, and so on. Each of these wireless communication protocols establish a standard transmission rate (e.g., frequency) at which the received data signal 212 is oscillated. For example, received data signals 212 transmitted in accordance with established wireless communication protocols may be transmitted with a transmission rate as low as a few hertz or up to tens of gigahertz.

Wake-up detection circuitry 200 is any circuitry comprising hardware and/or software configured to receive the received data signal 212, detect a wake-up pulse pattern, (e.g., wake-up pulse pattern 100) and provide a notification (e.g., wake-up signal match signal 224) to one or more coupled devices that a wake-up pulse pattern is detected. In some embodiments, the wake-up detection circuitry 200 may be configured as a portion of a wireless communication receiver of a wireless communication device. A wireless communication device and/or wireless communication receiver may comprise a low-power state or sleep state. The wireless communication device may enter the low-power state in an instance in which no received data signal 212 is detected at the wireless communication receiver. A low-power state or sleep state may disable various components of the wireless communication device to conserve power. The wake-up detection circuitry 200 may be enabled during the low-power or sleep state of the wireless communication device to recognize a wake-up pulse pattern, indicating data may be transmitted on a received data signal 212.

As depicted in FIG. 2, the wake-up detection circuitry 200 may include wake-up pattern detection circuitry 202. Wake-up pattern detection circuitry 202 comprises circuitry including hardware and/or software configured to receive a received data signal 212 comprising a wake-up pulse pattern (e.g., wake-up pulse pattern 100). The wake-up detection pattern circuitry 202 is further configured to operate according to a low-frequency clock 228. The wake-up pattern detection circuitry 202 is configured to recognize a wake-up pulse sequence (e.g., wake-up pulse sequence 102) and generate a wake-up sequence match signal 214, when a wake-up pulse sequence is detected.

A low-frequency clock 228 is an electronic clock signal (e.g., voltage or current) configured to oscillate between a high and a low state at an oscillating frequency. The low-frequency clock 228 may be utilized to synchronize actions within the wake-up detection circuitry 200. The low-frequency clock 228 is configured to operate at an oscillating frequency lower than the frequency of the received data signal. For example, in some embodiments, the low-frequency clock 228 may operate at an oscillating frequency between 10 kilohertz and 100 kilohertz; more preferably between 20 kilohertz and 50 kilohertz; most preferably between 30 kilohertz and 34 kilohertz. The low-frequency clock 228 may additionally exhibit a low-frequency oscillation period. A low-frequency oscillation period is the amount of time required to complete one oscillation cycle of the low-frequency clock. For example, in an instance in which the oscillating frequency of the low-frequency clock 228 is 32 kilohertz, the low-frequency oscillation period is 31.25 microseconds.

As further depicted in FIG. 2, the wake-up pattern detection circuitry 202 is configured to generate a wake-up sequence match signal 214. The wake-up sequence match signal 214 is asserted in an instance in which a portion of the received data signal 212 matches the expected wake-up pulse sequence. For example, in an instance in which the wake-up pulse pattern is configured to generate a wake-up pulse sequence comprising seven pulses in a pulse period, the wake-up pattern detection circuitry 202 may generate a wake-up sequence match signal 214 every time the wake-up pulse sequence is detected.

As further depicted in FIG. 2, the wake-up pattern detection circuitry 202 is configured to receive a detection enable signal 216 from the wake-up periodicity detection FSM 204. The detection enable signal 216 indicates to the wake-up pattern detection circuitry 202 to identify the wake-up pulse sequences 102 in the received data signal 212. For example, the detection enable signal 216 may be asserted after the wake-up periodicity detection FSM 204 exits the idle state and/or reset state as further described in relation to FIG. 8. An example embodiment of the wake-up pattern detection circuitry 202 is further described in relation to FIG. 3.

As further depicted in FIG. 2, the example wake-up detection circuitry 200 includes a wake-up periodicity detection FSM 204. A wake-up periodicity detection FSM 204 is any circuitry including hardware and/or software implementing a finite state machine configured to detect the periodicity (or regular repetition pattern) of the wake-up pulse sequence. As described in relation to FIG. 1, a wake-up pulse pattern may include a wake-up pulse sequence configured to repeat M times according to a repeat sequence period. The wake-up periodicity detection FSM 204 is configured to initiate detection of a valid wake-up pulse pattern upon reception of a first wake-up sequence match signal 214, indicating a portion of the received data signal 212 matching the anticipated wake-up pulse sequence. In some embodiments, the wake-up periodicity detection FSM 204 may initiate detection of a wake-up pulse pattern by issuing a parallel run scheduling request 218 via a parallel run scheduler 206.

A parallel run scheduler 206 is any circuitry including hardware and/or software configured to manage the parallel runs detected by the wake-up periodicity detection FSM 204. For example, in an instance in which the wake-up sequence match signal 214 is asserted by the wake-up pattern detection circuitry 202, the wake-up periodicity detection FSM 204 may request initiation of a parallel run. The parallel run scheduler 206 may be configured to determine the availability of resources to manage the parallel run. For example, the parallel run scheduler 206 may identify a max number of parallel runs based on the resources provided to management of parallel runs. In an instance in which there are resources available, the parallel run scheduler may initiate a parallel run scheduling request 218 with the parallel run detection circuitry 208. The parallel run scheduling request 218 may initiate the monitoring of wake-up sequence match signals 214 in relation to the parallel run to detect a full match of a wake-up pulse pattern. In an instance in which there are not resources available, the parallel run scheduler 206 may deny the request to monitor the parallel run, causing the wake-up periodicity detection FSM 204 to reset. The parallel run scheduler 206 is described further in relation to FIG. 9.

As further depicted in FIG. 2, the wake-up detection circuitry 200 includes parallel run detection circuitry 208. Parallel run detection circuitry 208 comprises any circuitry including hardware and/or software configured to manage the detection of a wake-up pulse pattern of multiple simultaneous parallel runs. A parallel run may be requested any time a wake-up sequence match signal 214 is received from the wake-up pattern detection circuitry 202 by the wake-up periodicity detection FSM 204.

Receipt of an initial wake-up sequence match signal 214 at a wake-up periodicity detection FSM 204 is an indication of a potential match to a wake-up pulse pattern in an instance in which the wake-up pulse sequence (indicated by the wake-up sequence match signal 214) is repeated M times according to a repeat sequence period, wherein M is dictated by the transmission protocol. Thus, in an instance in which an initial wake-up sequence match signal 214 is asserted, a first parallel run is initiated and the received data signal 212 is periodically checked according to the repeat sequence period to determine if the wake-up pulse sequence is repeated M times.

In the meantime (e.g., during the repeat sequence period following the initial wake-up sequence match signal 214), additional wake-up sequence match signals 214 may be received at the wake-up periodicity detection FSM 204. Each wake-up sequence match signal 214 is a potential start of a match with the wake-up pulse pattern. Thus, additional parallel runs may be initiated and checked for an instance in which the wake-up pulse sequence (indicated by the wake-up sequence match signal 214) is repeated M times according to a repeat sequence period.

The parallel run detection circuitry 208 is configured to check for another wake-up sequence match signal 214 at/or near the repeat sequence period for each parallel run initiated by the wake-up periodicity detection FSM 204. In an instance in which M wake-up pulse sequences are detected for a particular parallel run, each separated by the repeat sequence period, an indication of the success of the parallel run is provided to the wake-up periodicity detection FSM 204 by the parallel run schedule result signal 226. The wake-up periodicity detection FSM 204 may then transmit a wake-up signal match signal 224 indicating the wake-up pulse pattern has been detected.

As further depicted in FIG. 2, the wake-up detection circuitry 200 includes base period circuitry 210 configured to transmit a check time signal 220 to the parallel run detection circuitry 208. The base period circuitry 210 is any circuitry including hardware and/or software configured to determine a check time signal 220 based on the repeat sequence period of the anticipated wake-up pulse pattern and the low-frequency oscillation period of the low-frequency clock 228. For example, the check time signal 220 may be determined by dividing the repeat sequence period by the low-frequency oscillation period of the low-frequency clock 228 and rounding down. The check time signal 220 indicates a repeat sequence count, representing the number of low-frequency oscillation periods before the next wake-up pulse sequence in the wake-up pulse pattern arrives. The parallel run detection circuitry 208 may check for a wake-up sequence match signal 214 at or near the repeat sequence count for each parallel run. In addition, the repeat sequence count may be used to determine the number of parallel runs supported by the wake-up detection circuitry 200. For example, the wake-up detection circuitry 200 may support a number of parallel runs equal to the repeat sequence count.

As further depicted in FIG. 2, the wake-up detection circuitry 200 is configured to generate a wake-up signal match signal 224. The wake-up signal match signal 224 is any electronic signal or sequence of electronic signals indicating a wake-up pulse pattern was detected. The wake-up signal match signal 224 may be transmitted to one or more electrical components initiating one or more actions. For example, the wake-up signal match signal 224 may be transmitted to one or more components of an electrically coupled wireless communication receiver, causing the wireless communication receiver and/or wireless communication device to exit a low-power or sleep state.

Figure 3:
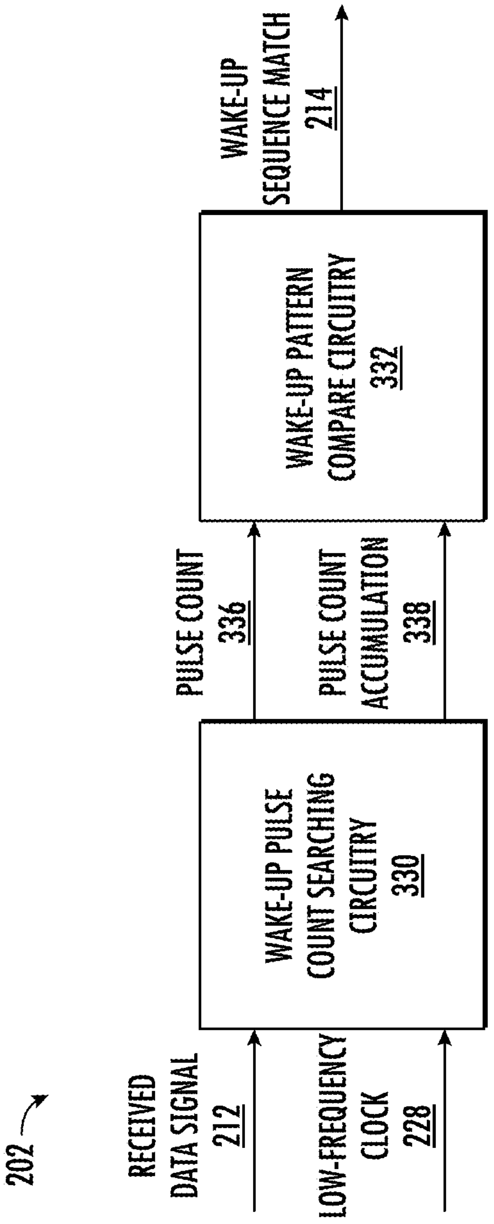
FIG. 3 illustrates a block diagram of example wake-up pattern detection circuitry in accordance with an example embodiment of the present disclosure.

Referring now to FIG. 3, an example embodiment of wake-up pattern detection circuitry 202 is provided. As depicted in FIG. 3, the example wake-up pattern detection circuitry 202 includes wake-up pulse count searching circuitry 330 configured to receive a received data signal 212 and operate according to a low-frequency clock 228. As further depicted in FIG. 3, the example wake-up pattern detection circuitry 202 includes wake-up pattern compare circuitry 332 configured to receive a pulse count 336 and a pulse count accumulation 338, each determined by the wake-up pulse count searching circuitry 330. The wake-up pattern compare circuitry 332 generates a wake-up sequence match signal 214 based on the pulse count 336 and the pulse count accumulation 338.

As depicted in FIG. 3, the example wake-up pattern detection circuitry 202 includes wake-up pulse count searching circuitry 330. Wake-up pulse count searching circuitry 330 is any circuitry including hardware and/or software configured to operate in synchronization with a low-frequency clock 228 to determine a pulse count 336 and a pulse count accumulation 338 associated with a received data signal 212. As described herein, a low-frequency clock 228 may be configured to oscillate at an oscillating frequency lower than the transmission rate (or frequency) of the received data signal 212. The oscillation cycle of the low-frequency clock 228 defines a low-frequency oscillation period. The wake-up pulse count searching circuitry 330 is configured to detect the pulse count 336, representing the number of pulses within each low-frequency oscillation period. In addition, the wake-up pulse count searching circuitry 330 is configured to determine a pulse count accumulation 338 based on the pulse count of a plurality of successive low-frequency oscillation periods. For example, if the wake-up pulse count searching circuitry 330 counts three pulses during a first low-frequency oscillation period and four pulses during a second low-frequency oscillation period succeeding the first low-frequency oscillation period, the pulse count accumulation 338 of the two successive low-frequency oscillation periods is seven.

The number of low-frequency oscillation periods included in the determination of the pulse count accumulation 338 is based on the low-frequency oscillation period and the pulse period of the wake-up pulse pattern. The number of low-frequency oscillation periods is large enough to cover a full pulse period. For example, if the pulse period is 90 microseconds and the low-frequency oscillation period is 30 microseconds, the wake-up pulse count searching circuitry 330 is configured to accumulate the pulse count 336 from at least three successive low-frequency oscillation periods. Example embodiments of wake-up pulse count searching circuitry 330 are further described in relation to FIG. 4 and FIG. 5.

As further depicted in FIG. 3, the example wake-up pattern detection circuitry 202 includes wake-up pattern compare circuitry 332. Wake-up pattern compare circuitry 332 is any circuitry including hardware and/or software configured to confirm the pulse count 336 and the pulse count accumulation 338 comply with an expected pulse count accumulation pattern. A pulse count accumulation pattern is any pattern comprising pulse count data (e.g., pulse count 336, pulse count accumulation 338) utilize to determine the presence of a wake-up pulse sequence in the received data signal 212. The wake-up pattern compare circuitry 332 may be configured to match any pattern based on the pulse count data. For example, in some embodiments, the pulse count accumulation 338 may track an approximately normal distribution, an approximately Gaussian distribution, or another similar data pattern.

A normal distribution is any data pattern of successive pulse count data approximately matching a bell shape curve center about one or more peak values. For example, an approximately normal distribution of pulse counts 336 may comprise one or more pulse counts 336 with a relatively small pulse count 336, building up to a peak pulse count 336, and followed by one or more pulse counts 336 reducing to a relatively small pulse count 336. For example, an example approximately normal distribution may comprise the following sequence of pulse counts 336: 1 pulse, 3 pulses, 7 pulses, 3 pulses, 1 pulse; or 3 pulses, 10 pulses, 4 pulses; or 2 pulses, 3 pulses, 9 pulses, 9 pulses, 4 pulses, 1 pulse; or something similar. In some embodiments, an approximately normal distribution may be described using a ratio or percentage of a peak value, for example: a pulse count 336 of less than 50% of the peak value; followed by a pulse count 336 equaling the peak value; followed by a pulse count 336 of less than 50% of the peak value. The pulse count accumulation pattern is described further in relation to FIG. 6A, FIG. 6B, and FIG. 7.

In an instance in which the pulse count data matches one or more pulse count accumulation patterns, the wake-up pattern detection circuitry 202 may be configured to generate a wake-up sequence match signal 214. The wake-up sequence match signal 214 indicates the wake-up pattern detection circuitry 202 has identified a sequence of pulses matching the wake-up pulse sequence of a potential wake-up pulse pattern.

Figure 4:
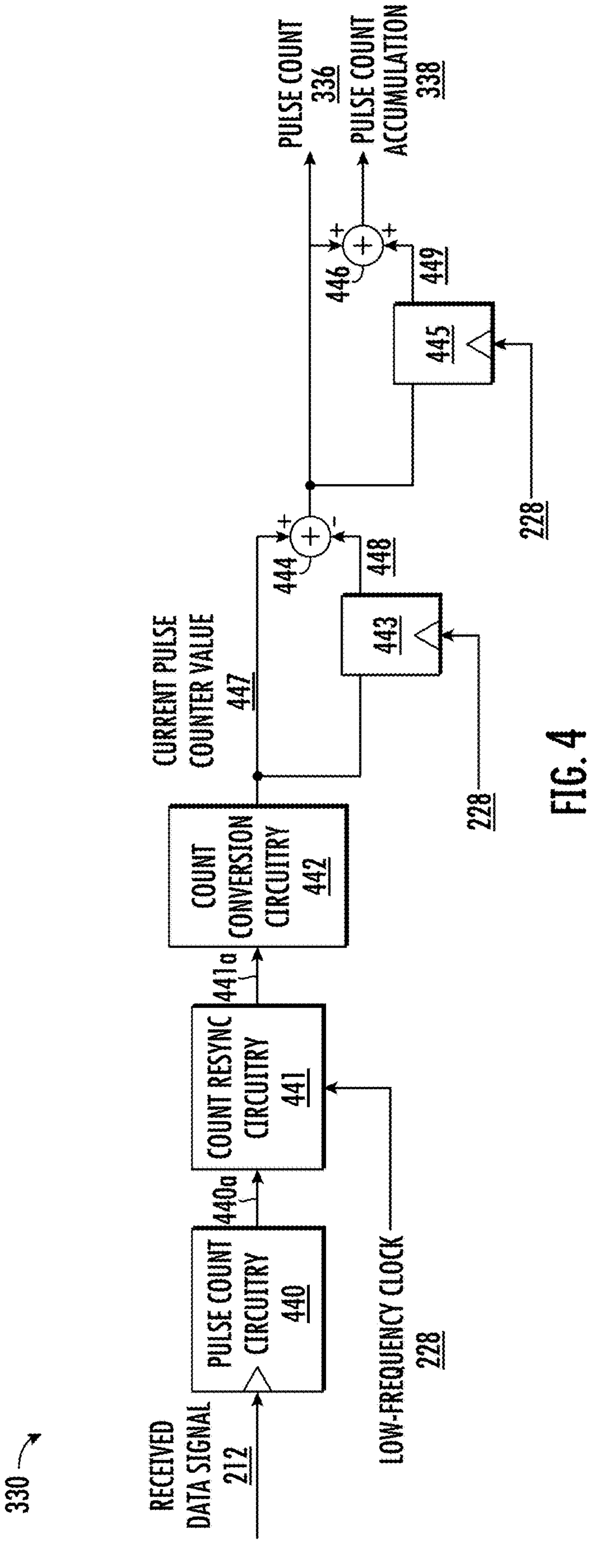
FIG. 4 illustrates an example embodiment of wake-up pulse count searching circuitry in accordance with an example embodiment of the present disclosure.

Referring now to FIG. 4, an example embodiment of wake-up pulse count searching circuitry 330 is provided. As depicted in FIG. 4, the wake-up pulse count searching circuitry 330 includes pulse count circuitry 440 configured to receive the received data signal 212 and generate a counter value 440*a*; count resync circuitry 441 configured to receive the counter value 440*a* and generate a resync count 441*a* in synchronization with a low-frequency clock 228; and count conversion circuitry 442 configured to convert the resync count 441*a* into a current pulse counter value 447. The wake-up pulse count searching circuitry 330 further includes a register 443 configured to receive the current pulse counter value 447 and generate a previous pulse counter value 448; and an adder 444 configured to combine the current pulse counter value 447 and the previous pulse counter value 448 to generate a pulse count 336. As further depicted in FIG. 4, the wake-up pulse count searching circuitry 330 includes a second register 445 configured to generate a previous pulse count 449; and a second adder 446 configured to combine the pulse count 336 and the previous pulse count 449 to generate a pulse count accumulation 338.

As depicted in FIG. 4, the example wake-up pulse count searching circuitry 330 includes pulse count circuitry 440.

The pulse count circuitry 440 comprises any circuitry including hardware and/or software configured to receive a received data signal 212 and increment a counter value 440*a* based on each pulse received in the received data signal 212. The counter value 440*a* may be stored in one or more memory locations accessible by the count resync circuitry 441. In some embodiments, the pulse count circuitry 440 may comprise a gray counter enabling accurate updates and reads of the counter value 440*a* even when updated at a high frequency. The pulse count circuitry 440 may operate asynchronously, updating the counter value 440*a* with each pulse received on the received data signal 212.

As further depicted in FIG. 4, the example wake-up pulse count searching circuitry 330 includes count resync circuitry 441. The count resync circuitry 441 is any circuitry including hardware and/or software configured to synchronously read the counter value 440*a* according to a low-frequency clock 228. The counter value 440*a* is transmitted to the count conversion circuitry 442 in synchronization with the low-frequency clock 228 as a resync count 441*a*. The resync count 441*a* represents the value of the counter comprising the pulse count circuitry 440 after each period of the low-frequency clock 228.

As further depicted in FIG. 4, the example wake-up pulse count searching circuitry 330 includes count conversion circuitry 442. The count conversion circuitry 442 is any circuitry including hardware and/or software configured to convert the resync count 441*a* into a current pulse counter value 447 compatible with the adder 444. For example, the count conversion circuitry 442 may convert a binary resync count 441*a* into a binary-coded decimal value current pulse counter value 447. The current pulse counter value 447 represents the current reading of the pulse count circuitry 440 converted to a compatible value and synchronized with the low-frequency clock 228.

As further depicted in FIG. 4, the example wake-up pulse count searching circuitry 330 includes a register 443. The register 443 is synchronized to update with the low-frequency clock 228 to generate the previous pulse counter value 448. The previous pulse counter value 448 represents the current pulse counter value 447 delayed by one low-frequency clock 228 oscillation period. Thus, the previous pulse counter value 448 is the value of the counter after the previous low-frequency oscillation period.

The adder 444 may be utilized to determine the difference between the current pulse counter value 447 and the previous pulse counter value 448 and output the result as the pulse count 336. Since the current pulse counter value 447 represents an accumulation of pulses counted at the pulse count circuitry 440, the difference determined at the adder 444 represents the number of pulses (e.g., pulse count 336) detected during the most recent low-frequency oscillation period. For example, if the current pulse counter value in the previous low-frequency oscillation period (e.g., previous pulse counter value 448) was 5, and the current pulse counter value 447 is 9, the difference determined at the adder 444 is 9−5=4. Thus, four pulses were received during the most recent low-frequency oscillation period. The result of the adder 444 is output as the pulse count 336.

As further depicted in FIG. 4, another register 445 is configured to receive the pulse count 336 and synchronize an update of the register with the low-frequency clock 228 to generate the previous pulse count 449. The previous pulse count 449 represents the pulse count 336 delayed by one low-frequency clock 228 oscillation period. Thus, the previous pulse count 449 is the number of pulses detected in the previous low-frequency oscillation period.

As further depicted in FIG. 4, the wake-up pulse count searching circuitry 330 further includes an adder 446 configured to add or accumulate the pulse count 336 and the pulse count accumulation 338. The pulse count accumulation 338 represents the accumulation of pulse counts over a plurality of successive low-frequency oscillation periods associated with the low-frequency clock 228. The register 445 and adder 446 enable the wake-up pulse count searching circuitry 330 to determine the total pulse count over a plurality of successive low-frequency oscillation periods. Thus, the pulse count in a pulse period (e.g., pulse period 106) longer than the low-frequency oscillation period may be determined. For example, in an instance in which the pulse count 336 is 5 and the previous pulse count 449 representing the pulse count 336 in the previous low-frequency oscillation period is 4, the pulse count accumulation 338 is 9, representing the number of pulses received over the last two low-frequency oscillation periods. A pulse count accumulation 338 equaling the number of pulses expected in a wake-up pulse sequence (e.g., N pulses in wake-up pulse sequence 102) may be an indicator that a wake-up pulse sequence 102 has been received.

As depicted in FIG. 4, only one register 445 is used to determine the pulse count accumulation 338. The number of registers 445 required to generate a pulse count accumulation 338 at least covering a full pulse period is dependent on the length of the pulse period and the low-frequency oscillation period. Example wake-up pulse count searching circuitry 330 comprising a variable plurality of registers 445 is described in relation to FIG. 5.

Figure 5:
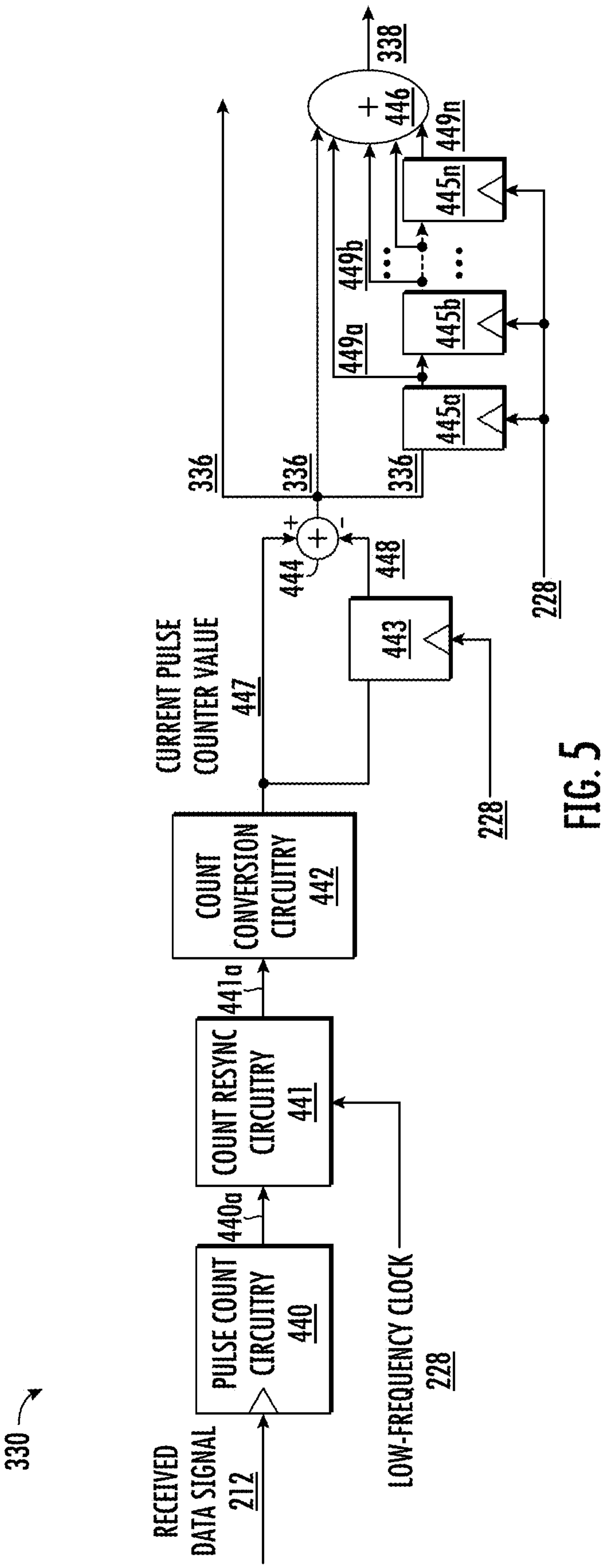
FIG. 5 illustrates another example embodiment of wake-up pulse count searching circuitry in accordance with an example embodiment of the present disclosure.

Referring now to FIG. 5, example wake-up pulse count searching circuitry 330 having a variable number of registers 445*a*-445*n* is provided. As depicted in FIG. 5, the wake-up pulse count searching circuitry 330 includes pulse count circuitry 440 configured to receive the received data signal 212 and generate a counter value 440*a*; count resync circuitry 441 configured to receive the counter value 440*a* and generate a resync count 441*a* in synchronization with a low-frequency clock 228; and count conversion circuitry 442 configured to convert the resync count 441*a* into a current pulse counter value 447. The wake-up pulse count searching circuitry 330 further includes a register 443 configured to receive the current pulse counter value 447 and generate a previous pulse counter value 448 and an adder 444 configured to combine the current pulse counter value 447 and the previous pulse counter value 448 to generate a pulse count 336. As further depicted in FIG. 5, the wake-up pulse count searching circuitry 330 includes one or more registers 445*a*-445*n* connected in series, each synchronized according to the low-frequency clock 228 and configured to propagate the pulse count 336 through each of the series of one or more registers 445*a*-445*n* at each low-frequency oscillation period. Thus, each of the one or more registers 445*a*-445*n* generate a previous pulse count 449*a*-449*n* corresponding to a pulse count 336 in a previous low-frequency oscillation period. The pulse count 336 along with each of the previous pulse counts 449*a*-449*n* are added by an adder 446 to determine a pulse count accumulation 338 over the previous low-frequency oscillation periods corresponding to the one or more registers 445*a*-445*n*.

As depicted in relation to FIG. 5, the wake-up pulse count searching circuitry 330 comprises one or more registers 445*a*-445*n* utilized to determine the pulse count accumulation 338. The number ($REG_{num}$) of one or more registers 445*a*-445*n* may be determined based on the low-frequency oscillation period and the pulse period in which the N pulses of the wake-up pulse sequence are to be detected as described in relation to FIG. 1. The number of one or more registers 445*a*-445*n* may further determine the sequential pulse count quantity. The sequential pulse count quantity relates to the number of sequential pulse counts accumulated at the adder 446. In some embodiments, the sequential pulse count quantity is equivalent to the number of one or more registers 445*a*-445*n* plus one.

As depicted in FIG. 5, the time period spanned by the one or more registers 445*a*-445*n* is configured to equal or exceed the pulse period. For example, in an instance in which the low-frequency oscillation period is 31.25 microseconds and the pulse period is 90 microseconds, two registers 445*a*-445*n* may be required such that the time period spanned by the registers 445*a*-445*n* (93.75 microseconds) is equal to or greater than the pulse period (90 microseconds).

In some embodiments, the number of registers 445*a*-445*n* that are included in the wake-up pulse count searching circuitry 330 may be determined by an equation similar to Equation (1):

$$REG_{num} = \text{CEILING}\left(\frac{P}{C}\right) \tag{1}$$

Where $REG_{num}$ is the number of registers 445*a*-445*n*, P is the pulse period, C is the oscillation period of the low-frequency clock 228 (e.g., low-frequency oscillation period), and CEILING is a function that outputs the smallest integer greater than or equal to P/C. For example, in an instance in which the pulse period is 120 microseconds and the low-frequency oscillation period is 31.25 microseconds:

$$REG_{num} = \text{CEILING}\ (120\ \text{microseconds}/31.25\ \text{microseconds}) = 4$$

Thus, four registers 445*a*-445*n* may be required to span the pulse period.

The pulse count accumulation 338 depicted in FIG. 5 relates to the summation of the most recent pulse count 336 and the pulse count 336 from the previous low-frequency oscillation periods stored in the various registers 445*a*-445*n*. In an instance in which the time period spanned by the registers 445*a*-445*n* is equal to or greater than the pulse period, at least one pulse count accumulation 338 is greater than or equal to the number of pulses expected in a pulse period when a wake-up pulse pattern is received.

Figure 6A:
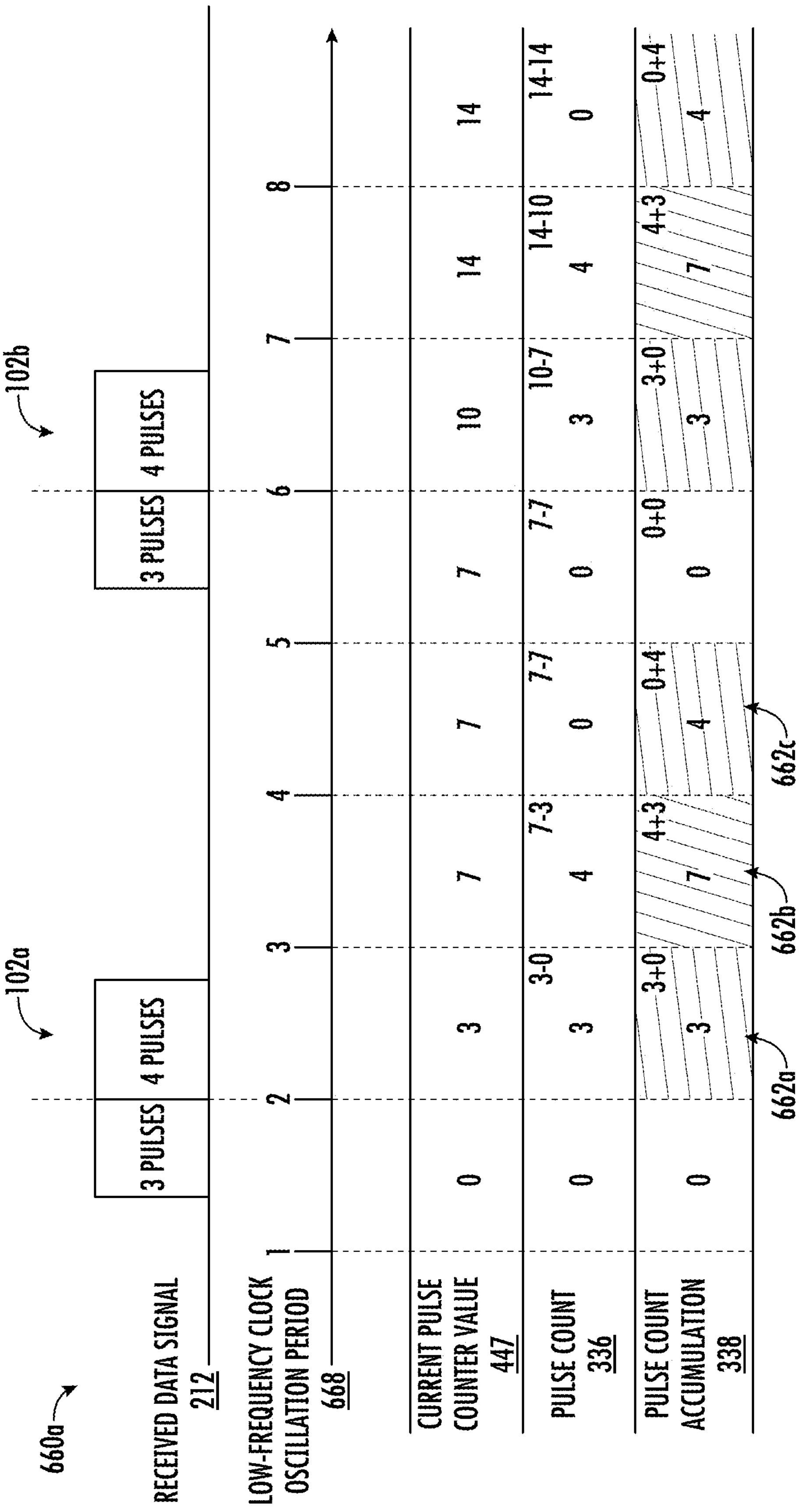
FIG. 6A-FIG. 6B illustrate example signal diagrams of a received data signals comprising a wake-up pulse pattern in accordance with an example embodiment of the present disclosure.

Referring now to FIG. 6A, an example signal diagram 660*a* during reception of a wake-up pulse sequence at the wake-up pulse count searching circuitry (e.g., wake-up pulse count searching circuitry 330 as described in relation to FIG. 4) is provided.

As depicted in FIG. 6A, a received data signal 212 is received at the wake-up pulse count searching circuitry. The received data signal 212 comprises a series of wake-up pulse sequences 102*a*-102*b*, each comprising 7 pulses.

As further depicted in FIG. 6A, the signal diagram 660*a* is vertically divided by the low-frequency clock oscillation periods 668 corresponding to each of the successive oscillation periods of the low-frequency clock (e.g., 1, 2, 3 . . . 8). The respective values of the current pulse counter value 447, the pulse count 336, and the pulse count accumulation 338, during each low-frequency clock oscillation period 668 are depicted.

As depicted in FIG. 6A, the wake-up pulse sequence 102*a* begins on the received data signal 212 during the first low-frequency clock oscillation period 668 in an instance in which the pulse count circuitry (e.g., pulse count circuitry 440) is initialized to 0. A first portion of the wake-up pulse sequence 120*a* increments the pulse count circuitry during the first low-frequency clock oscillation period 668. On the transition from the first low-frequency clock oscillation period 668 to the second low-frequency clock oscillation period 668, the counter value (3) of the pulse count circuitry is read by the count resync circuitry (e.g., count resync circuitry 441) and converted to the current pulse counter value 447 (3). The previous pulse counter value (0) is subtracted from the current pulse counter value 447 (3) and output as the pulse count 336 (3). The pulse count 336 is also added to the previous pulse count (e.g., previous pulse count 449), which is zero and output as the pulse count accumulation 338 (3) representing the pulse count 336 of the last two low-frequency oscillation periods (1-2).

A second portion of the wake-up pulse sequence 102*a* continues to increment the pulse count circuitry during the second low-frequency clock oscillation period 668. On the transition from the second low-frequency clock oscillation period 668 to the third low-frequency clock oscillation period 668, the counter value (7) of the pulse count circuitry is read by the count resync circuitry and converted to the current pulse counter value 447 (7). The previous pulse counter value (3) is subtracted from the current pulse counter value 447 (7) and output as the pulse count 336 (4). The pulse count 336 is also added to the previous pulse count (e.g., previous pulse count 449), which is three and output as the pulse count accumulation 338 (7) representing the pulse count 336 of the last two low-frequency oscillation periods (2-3).

During the third low-frequency clock oscillation period 668 the wake-up pulse sequence 102*a* has completed and no additional pulses are transmitted on the received data signal 212. On the transition from the third low-frequency clock oscillation period 668 to the fourth low-frequency clock oscillation period 668, the counter value (7) of the pulse count circuitry is read by the count resync circuitry and converted to the current pulse counter value 447 (7). The previous pulse counter value (7) is subtracted from the current pulse counter value 447 (7) and output as the pulse count 336 (0). The pulse count 336 is also added to the previous pulse count (e.g., previous pulse count 449), which is four and output as the pulse count accumulation 338 (4) representing the pulse count 336 of the last two low-frequency oscillation periods (3-4).

As depicted in FIG. 6A, the second sequential pulse count accumulation 662*a*, the third sequential pulse count accumulation 662*b*, and the fourth sequential pulse count accumulation 662*c* form a pulse count accumulation pattern. The pulse count accumulation pattern includes a small portion of pulses relative to the expected number of pulses in a wake-up pulse sequence, followed by one or more low-frequency clock oscillation periods comprising a peak number of pulses equivalent to the expected number of pulses in a wake-up pulse sequence, followed once again by a small portion of pulses relative to the expected number of pulses in a wake-up pulse sequence. Such a sequence of pulse count accumulations 338 represents an approximately normal distribution. Thus, wake-up pattern compare circuitry (e.g., wake-up pattern compare circuitry 332) or similar circuitry may detect the pulse count accumulation pattern and output a wake-up sequence match signal 214.

As further depicted in FIG. 6A, the process is completed again in an instance in which the wake-up pulse sequence 102*b* arrives, however, in the instance in which the second wake-up pulse sequence 102*b* arrives, the current pulse counter value 447 begins at 7.

Figure 6B:
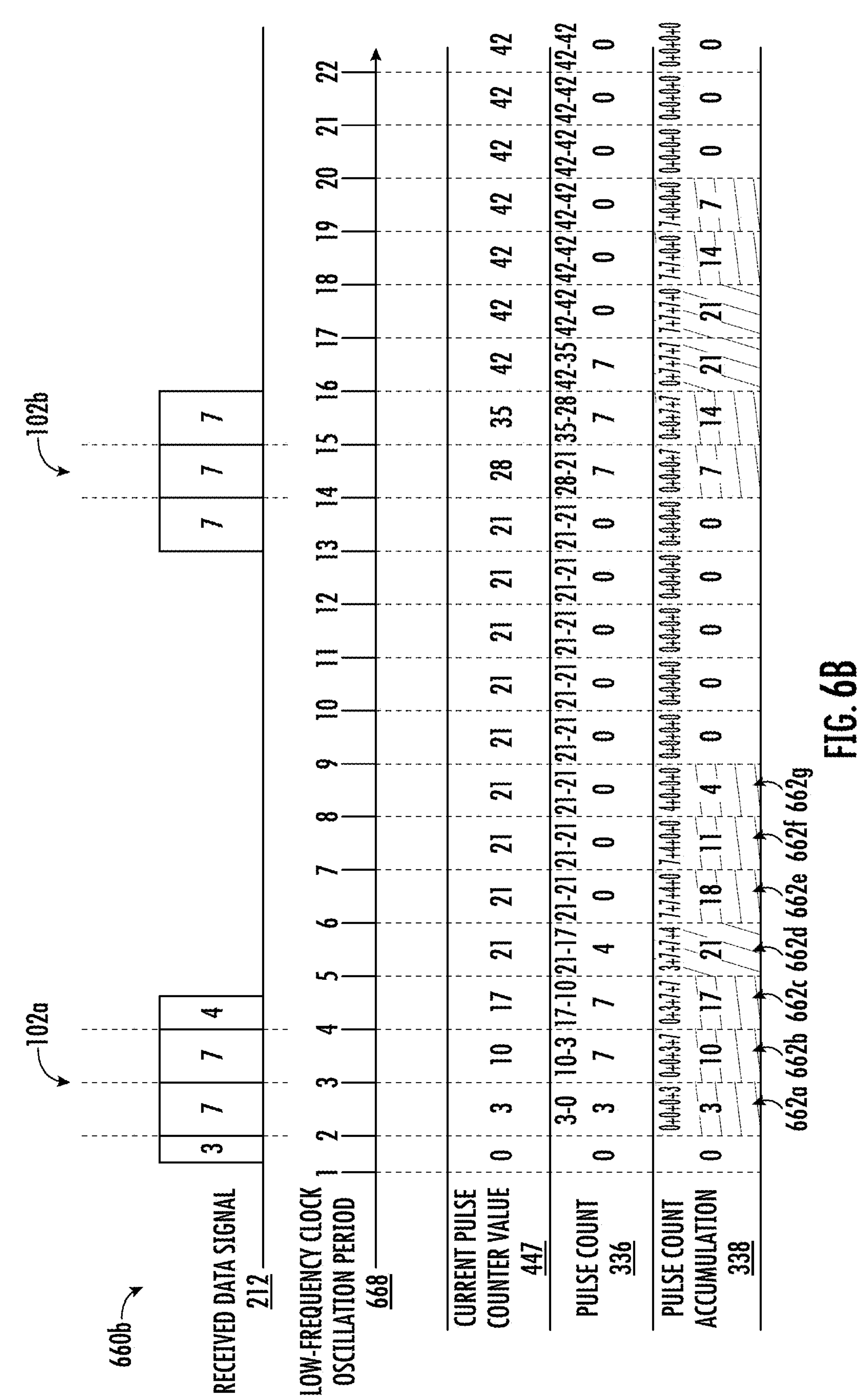

Referring now to FIG. 6B, an example signal diagram 660*b* during reception of a wake-up pulse sequence at the wake-up pulse count searching circuitry (e.g., wake-up pulse count searching circuitry 330 as described in relation to FIG. 5) is provided.

As depicted in FIG. 6B, a received data signal 212 is received at the wake-up pulse count searching circuitry. The received data signal 212 comprises a series of wake-up pulse sequences 102*a*-102*b*, each comprising 21 pulses. As further depicted in FIG. 6B, the wake-up pulse count searching circuitry comprises three accumulation registers (e.g., registers 445*a*-445*n*). Thus, the pulse count accumulation 338 represents the accumulation of the pulse count 336 over the previous 4 low-frequency clock oscillation periods 668.

As further depicted in FIG. 6B, the signal diagram 660*b* is vertically divided by the low-frequency clock oscillation periods 668 corresponding to each of the successive oscillation periods of the low-frequency clock (e.g., 1, 2, 3 . . . 22). The respective values of the current pulse counter value 447, the pulse count 336, and the pulse count accumulation 338, during each low-frequency clock oscillation period 668 are depicted.

As depicted in FIG. 6B, the wake-up pulse sequence 102*a* begins on the received data signal 212 during the first low-frequency clock oscillation period 668 in an instance in which the pulse count circuitry (e.g., pulse count circuitry 440) is initialized to 0. A first portion of the wake-up pulse sequence 102*a* increments the pulse count circuitry during the first low-frequency clock oscillation period 668. On the transition from the first low-frequency clock oscillation period 668 to the second low-frequency clock oscillation period 668, the counter value (3) of the pulse count circuitry is read by the count resync circuitry (e.g., count resync circuitry 441) and converted to the current pulse counter value 447 (3). The previous pulse counter value (0) is subtracted from the current pulse counter value 447 (3) and output as the pulse count 336 (3). The pulse count 336 is added to all previous pulse counts (e.g., previous pulse counts 449*a*-449*n*), all of which are zero, and output as the pulse count accumulation 338 (3) representing the pulse count 336 of the last four low-frequency oscillation periods (1-2).

A second portion of the wake-up pulse sequence 102*a* continues to increment the pulse count circuitry during the second low-frequency clock oscillation period 668. On the transition from the second low-frequency clock oscillation period 668 to the third low-frequency clock oscillation period 668, the counter value (10) of the pulse count circuitry is read by the count resync circuitry and converted to the current pulse counter value 447 (10). The previous pulse counter value (3) is subtracted from the current pulse counter value 447 (10) and output as the pulse count 336 (7). The pulse count 336 (7) is also added to the three previous pulse counts, all of which add up to three and output as the pulse count accumulation 338 (10) representing the pulse count 336 of the last four low-frequency oscillation periods (1-3).

A third portion of the wake-up pulse sequence 102*a* continues to increment the pulse count circuitry during the third low-frequency clock oscillation period 668. On the transition from the third low-frequency clock oscillation period 668 to the fourth low-frequency clock oscillation period 668, the counter value (17) of the pulse count circuitry is read by the count resync circuitry and converted to the current pulse counter value 447 (17). The previous pulse counter value (10) is subtracted from the current pulse counter value 447 (17) and output as the pulse count 336 (7). The pulse count 336 (7) is also added to the three previous pulse counts, all of which add up to ten and output as the pulse count accumulation 338 (17) representing the pulse count 336 of the last four low-frequency oscillation periods (1-4).

A fourth portion of the wake-up pulse sequence 102*a* continues to increment the pulse count circuitry during the fourth low-frequency clock oscillation period 668. On the transition from the fourth low-frequency clock oscillation period 668 to the fifth low-frequency clock oscillation period 668, the counter value (21) of the pulse count circuitry is read by the count resync circuitry and converted to the current pulse counter value 447 (21). The previous pulse counter value (17) is subtracted from the current pulse counter value 447 (21) and output as the pulse count 336 (4). The pulse count 336 (4) is also added to the three previous pulse counts, all of which add up to seventeen and output as the pulse count accumulation 338 (21) representing the pulse count 336 of the last four low-frequency oscillation periods (2-5).

During the fifth low-frequency clock oscillation period 668 the wake-up pulse sequence 102*a* has completed and no additional pulses are transmitted on the received data signal 212. On the transition from the fifth low-frequency clock oscillation period 668 to the sixth low-frequency clock oscillation period 668, the counter value (21) of the pulse count circuitry is read by the count resync circuitry and converted to the current pulse counter value 447 (21). The previous pulse counter value (21) is subtracted from the current pulse counter value 447 (21) and output as the pulse count 336 (0). The pulse count 336 (0) is also added to the three previous pulse counts, all of which add up to eighteen and output as the pulse count accumulation 338 (18) representing the pulse count 336 of the last four low-frequency oscillation periods (3-6).

No further pulses are received over the next three low-frequency clock oscillation periods 668 (7-9), thus, the pulse count accumulation 338 continues to decline.

As depicted in FIG. 6B, the sequential pulse count accumulations 662*a*-662*g* form a pulse count accumulation pattern. The pulse count accumulation pattern includes one or more low-frequency clock oscillation periods 668 exhibiting a small portion of pulses relative to the expected number of pulses in a wake-up pulse sequence (e.g., 662*a*-662*c*), building toward one or more low-frequency clock oscillation periods 668 comprising a peak number of pulses (e.g., 662*d*) equivalent to the expected number of pulses in a wake-up pulse sequence, followed once again by one or more low-frequency clock oscillation periods 668 descending from the peak number of pulses to a small portion of pulses relative to the expected number of pulses in a wake-up pulse sequence (e.g., 662*e*-662*g*). Such a sequence of pulse count accumulations 338 represents an approximately normal distribution. Thus, wake-up pattern compare circuitry (e.g., wake-up pattern compare circuitry 332) or similar circuitry may detect the pulse count accumulation pattern and output a wake-up sequence match signal 214.

As further depicted in FIG. 6B, the process is completed again in an instance in which the wake-up pulse sequence 102*b* arrives, however, in the instance in which the second wake-up pulse sequence 102*b* arrives, the current pulse counter value 447 begins at 21. In addition, the wake-up pulse sequence 102*b* is received in three successive low-frequency clock oscillation periods 668 (13-15), each comprising seven pulses.

Figure 7:
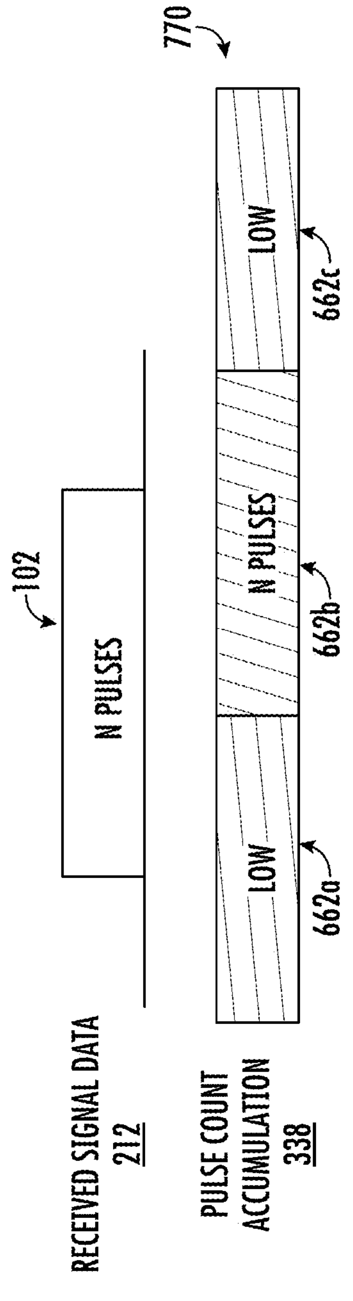
FIG. 7 illustrates an example pulse count accumulation pattern in accordance with an example embodiment of the present disclosure.

Referring now to FIG. 7, an example pulse count accumulation pattern 770 is provided. A pulse count accumulation pattern 770 is any pattern comprising pulse count data (e.g., pulse count 336, pulse count accumulation 338) utilized to determine the presence of a wake-up pulse sequence 102 in the received data signal 212. The wake-up pattern compare circuitry 332 may be configured to match any pattern based on the pulse count data. For example, in some embodiments, the pulse count accumulation 338 may track an approximately normal distribution, an approximately Gaussian distribution, or another similar data pattern.

As depicted in FIG. 7, an approximately normal distribution of pulse count accumulations 338 may comprise one or more pulse count accumulations 338 with a relatively low pulse count accumulation 338 (e.g., sequential pulse count accumulation 662*a*), building up to a peak pulse count accumulation 338 (e.g., sequential pulse count accumulation 662*b*), and followed by one or more pulse count accumulations 338 reducing to a relatively low pulse count accumulation 338 (e.g., sequential pulse count accumulation 662*c*). A low sequential pulse count accumulation 662*a*, 662*c* may be represented as a percentage or ratio and/or a series of percentages or ratios of the expected pulse count in the wake-up pulse sequence 102 (e.g., N pulses).

Figure 8:
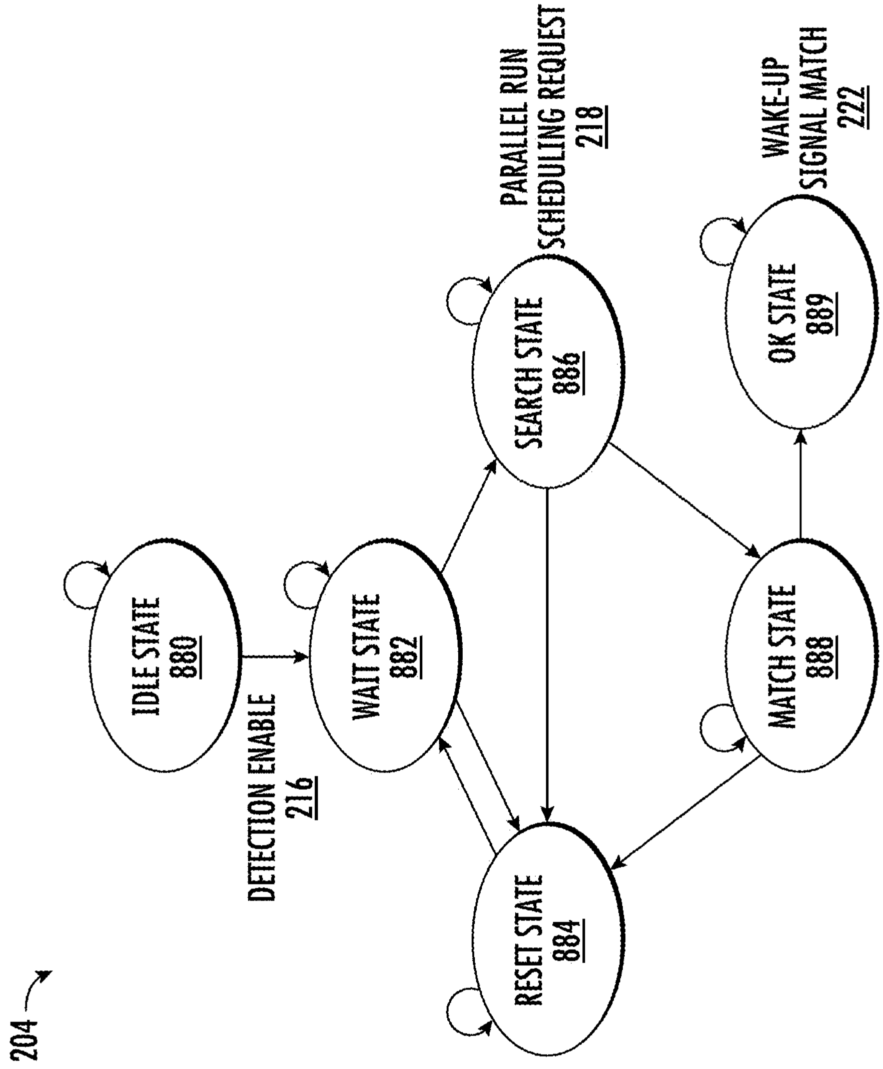
FIG. 8 illustrates an example wake-up periodicity detection finite state machine in accordance with an example embodiment of the present disclosure.

Referring now to FIG. 8, an example wake-up periodicity detection FSM 204 is provided. As depicted in FIG. 8, the example wake-up periodicity detection FSM 204 includes an idle state 880, a wait state 882, a reset state, 884, a search state 886, a match state 888, and an OK state 889 configured to output a wake-up signal match 222.

As depicted in FIG. 8, the example wake-up periodicity detection FSM 204 includes an idle state 880. The wake-up periodicity detection FSM 204 begins operation in the idle state 880. Once an indication that the wake-up detection circuitry 200 has initialized, for example, by an initialization counter, is received, the wake-up periodicity detection FSM 204 moves to the wait state 882.

As depicted in FIG. 8, the example wake-up periodicity detection FSM 204 includes a wait state 882. In the wait state 882, the wake-up periodicity detection FSM 204 waits for the reception of an indication that a wake-up pulse sequence (e.g., wake-up pulse sequence 102) has indicated. For example, a wake-up sequence match signal 214 may be received. In an instance in which a wake-up sequence match signal 214 is received, indicating the detection of a potential wake-up pulse sequence the wake-up periodicity detection FSM 204 continues operation at the search state 886. In an instance in which the pulse count circuitry (e.g., pulse count circuitry 440) wraps, the wake-up periodicity detection FSM 204 continues operation at the reset state 884.

As depicted in FIG. 8, the example wake-up periodicity detection FSM 204 includes a reset state 884. In the reset state 884, the wake-up periodicity detection FSM 204 resets and/or awaits the re-initialization of the wake-up periodicity detection FSM 204, for example, the pulse count circuitry. Once the wake-up periodicity detection FSM 204 is reset, operation continues at the wait state 882.

As depicted in FIG. 8, the example wake-up periodicity detection FSM 204 includes a search state 886. In the search state 886, the first parallel run is requested by the parallel run scheduler (e.g., parallel run scheduler 206) by transmitting a parallel run enable signal (e.g., parallel run enable 990 as described in relation to FIG. 9). Additional parallel runs may be requested in an instance in which the wake-up pattern detection circuitry 202 issues another wake-up sequence match signal 214 while the wake-up periodicity detection FSM 204 awaits a parallel run schedule result signal 226 in the search state 886. The wake-up periodicity detection FSM 204 remains in the search state 886 until a parallel run schedule result signal 226 corresponding to the parallel run is transmitted to the wake-up periodicity detection FSM 204. In an instance in which the parallel run detection circuitry indicates a wake-up sequence match signal 214 was received during the next search period for the parallel run, operation of the wake-up periodicity detection FSM 204 continues at the match state 888. In an instance in which the parallel run detection circuitry indicates a wake-up sequence match signal 214 was not received during the next search period or the parallel run was not scheduled, the detection of the wake-up pulse pattern for the particular parallel run fails and operation of the wake-up periodicity detection FSM 204 continues at the reset state 884.

As depicted in FIG. 8, the example wake-up periodicity detection FSM 204 includes a match state 888. The wake-up periodicity detection FSM 204 continues operation at the match state 888 in an instance in which a first wake-up pulse sequence 102 has been received and a second wake-up sequence match signal 214 is received at or near the repeat sequence period (e.g., repeat sequence period 104) defined by the wake-up pulse pattern. Operation continues in the match state 888 continuing to monitor the receipt of additional wake-up pulse sequences 102 during subsequent repeat sequence periods. In an instance in which the repetition of the wake-up pulse sequence 102 is repeated M times (wherein M is defined by the wake-up pulse pattern) according to a repeat sequence period 104, a match of the wake-up pulse pattern is detected and the operation of the wake-up periodicity detection FSM 204 moves to the OK state 889. In an instance in which the repetition of the wake-up pulse sequence 102 is not matched, the potential wake-up pulse pattern fails, and operation of the wake-up periodicity detection FSM 204 continues at the reset state 884.

As depicted in FIG. 8, the example wake-up periodicity detection FSM 204 includes an OK state 889. The wake-up periodicity detection FSM 204 continues operation in the OK state 889 in an instance in which the initial wake-up pulse sequence has been detected and the wake-up pulse sequence is repeated according to the repeat sequence period in accordance with the wake-up pulse pattern. At the OK state 889, a wake-up signal match signal (e.g., wake-up signal match 222) is transmitted.

Figure 9:
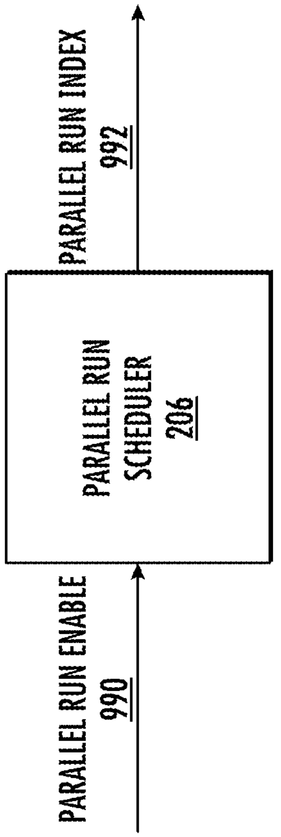
FIG. 9 illustrates a block diagram of an example parallel run scheduler in accordance with an example embodiment of the present disclosure.

Referring now to FIG. 9, an example parallel run scheduler 206 is depicted. The parallel run scheduler 206 is configured to receive a parallel run enable 990 signal from the wake-up periodicity detection FSM 204 and determine an available index for the parallel run. In an instance in which there are no more resources to track the requested parallel run, the parallel run scheduler indicates to the wake-up periodicity detection FSM 204 that the parallel run request failed. However, in an instance in which there are resources available to track a parallel run, the parallel run scheduler 206 generates a parallel run index 992 for the parallel run and transmits the parallel run index 992 to the parallel run detection circuitry. The parallel run index 992 is any identifier configured to identify the parallel run in the parallel run detection circuitry.

Figure 10:
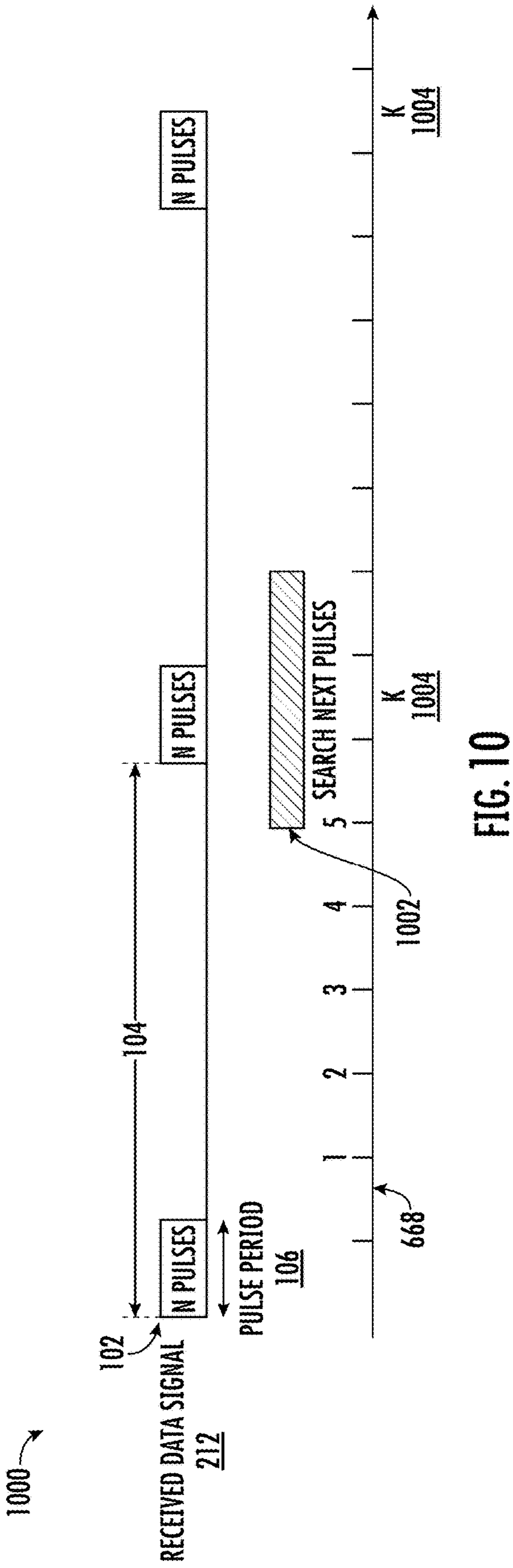
FIG. 10 illustrates an example signal diagram of a next search period in accordance with an example embodiment of the present disclosure.

Referring now to FIG. 10, an example signal diagram 1000 depicting a next search period 1002 is provided. As described herein, a parallel run is initiated by the detection of a wake-up pulse sequence 102 as indicated by a wake-up sequence match signal 214. For each parallel run, the parallel run detection circuitry (e.g., parallel run detection circuitry 208) may determine a next search period 1002 based on the check time (e.g., check time signal 220)

provided by the base period circuitry (e.g., base period circuitry 210). The check time indicates a repeat sequence count 1004, representing the number of low-frequency oscillation periods before the next wake-up pulse sequence in the wake-up pulse pattern arrives. The repeat sequence count 1004 may be determined based on the low-frequency oscillation period of the low-frequency clock (e.g., low-frequency clock 228) and the repeat sequence period (e.g., repeat sequence period 104) of the wake-up pulse pattern. For example, the repeat sequence count 1004 may be determined utilizing an equation similar to Equation (2):

$$K = \text{FLOOR}\left(\frac{T}{C}\right) \tag{2}$$

Where T is the repeat sequence period, C is the low-frequency oscillation period, K is the repeat sequence count 1004, and FLOOR is a function that outputs the greatest integer less than or equal to T/C. For example, in an instance in which the repeat sequence period is 200 microseconds and the low-frequency oscillation period is 31.25 microseconds:

$$K = \text{FLOOR}\left(200\text{ microseconds}/31.25\text{ microseconds}\right) = 6$$

Thus, the next wake-up pulse sequence occurs after 6 low-frequency oscillation periods.

As depicted in FIG. 10, the signal diagram 1000 includes a next search period 1002. The next search period 1002 is any calculated time period within which a subsequent wake-up pulse sequence is expected to arrive. In some embodiments, the next search period 1002 may be expressed in terms of the repeat sequence count 1004. For example, the next search period 1002 may include one or more low-frequency clock oscillation periods 668 before and/or after the repeat sequence count 1004. As depicted in FIG. 10, the calculated repeat sequence count 1004 (K) falls in the sixth low-frequency clock oscillation period 668. Thus, the next search period 1002 may be defined as the fifth low-frequency clock oscillation period 668 through the seventh low-frequency clock oscillation period 668. In an instance in which the wake-up pulse sequence 102 is received within the next search period 1002 the parallel run detection circuitry may return a parallel run schedule result signal 226 to the wake-up periodicity detection FSM 204 indicating a match.

In some embodiments, the maximum number of parallel runs may be determined based on the repeat sequence count. For example, the maximum number of parallel runs may be equivalent to the repeat sequence count. The maximum number of parallel runs may be determined based on the repeat sequence count because the repeat sequence count represents the number low-frequency clock oscillation periods 668 between a first wake-up pulse sequence 102 and a subsequent wake-up pulse sequence 102. Thus, the repeat sequence count may represent the number of possible wake-up pulse sequences 102 detected during a repeat sequence period 104.

Figure 11:
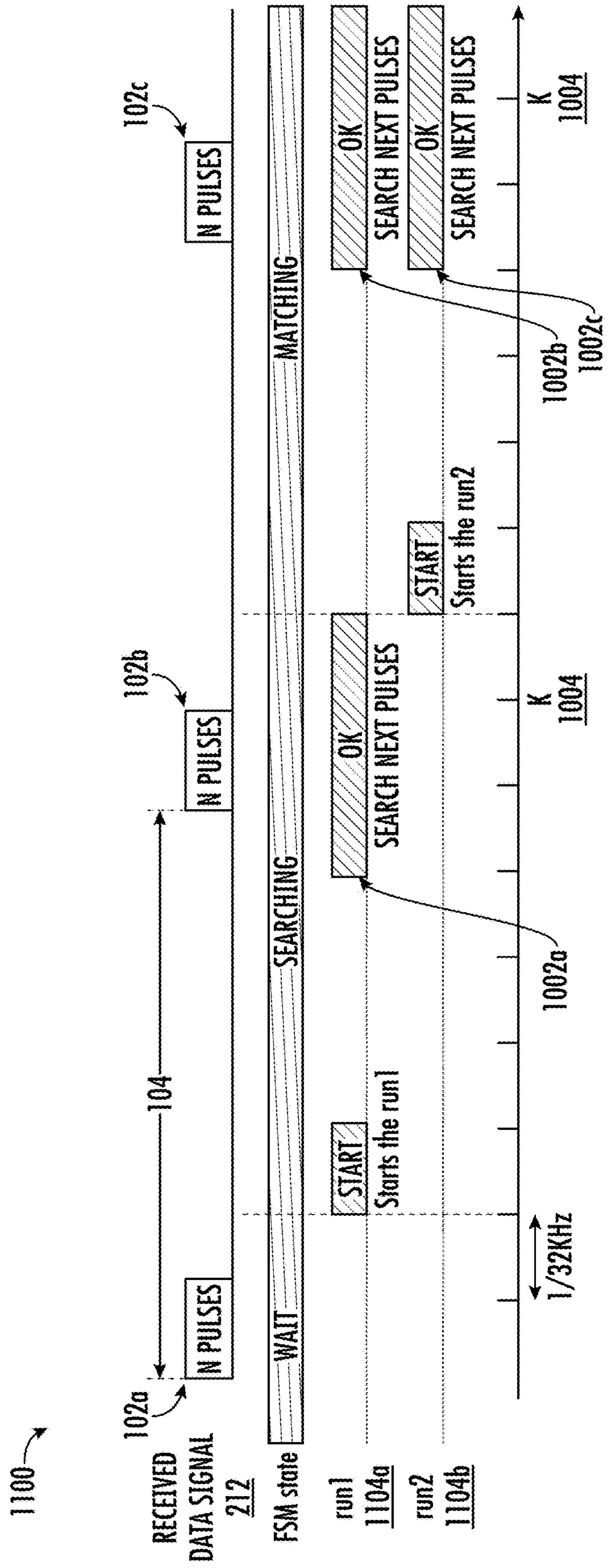
FIG. 11 illustrates an example signal diagram of parallel runs during wake-up pulse pattern detection in accordance with an example embodiment of the present disclosure.

Referring now to FIG. 11, an example signal diagram 1100 depicting initiation of a plurality of parallel runs (e.g., parallel run 1104*a*, parallel run 1104*b*) is depicted.

As depicted in FIG. 11, a first wake-up pulse sequence 102*a* arrives on the received data signal 212. Reception of the first wake-up pulse sequence 102*a* updates the state in the wake-up periodicity detection FSM (e.g., wake-up periodicity detection FSM 204) from the wait state to the search state. In addition, a first parallel run 1104*a* is initiated. The parallel run detection circuitry (e.g., parallel run detection circuitry 208) determines a next search period 1002*a* associated with the first parallel run 1104*a* based on a check time (e.g., check time signal 220). As described herein, the check time and/or next search period 1002*a* may be based on a repeat sequence count 1004. The parallel run detection circuitry is configured to recognize the transmission of a wake-up sequence match (e.g., wake-up sequence match signal 214), indicating arrival of a second wake-up pulse sequence 102*b*, during the next search period 1002*a*. In an instance in which a wake-up sequence match is received during the next search period 1002*a* for the first parallel run 1104*a*, an indication is sent to the wake-up periodicity detection FSM and the wake-up periodicity detection FSM directs operation to the match state.

However, the receipt of the second wake-up pulse sequence 102*b* while the first parallel run 1104*a* is in the search state triggers the start of a second parallel run 1104*b*. The parallel run detection circuitry determines a next search period 1002*b* associated with the second parallel run 1104*b* based on a check time. In an instance in which the first parallel run 1104*a* is not part of a valid wake-up pulse pattern. Identification of the wake-up pulse pattern may continue with the second parallel run 1104*b*.

Figure 12:
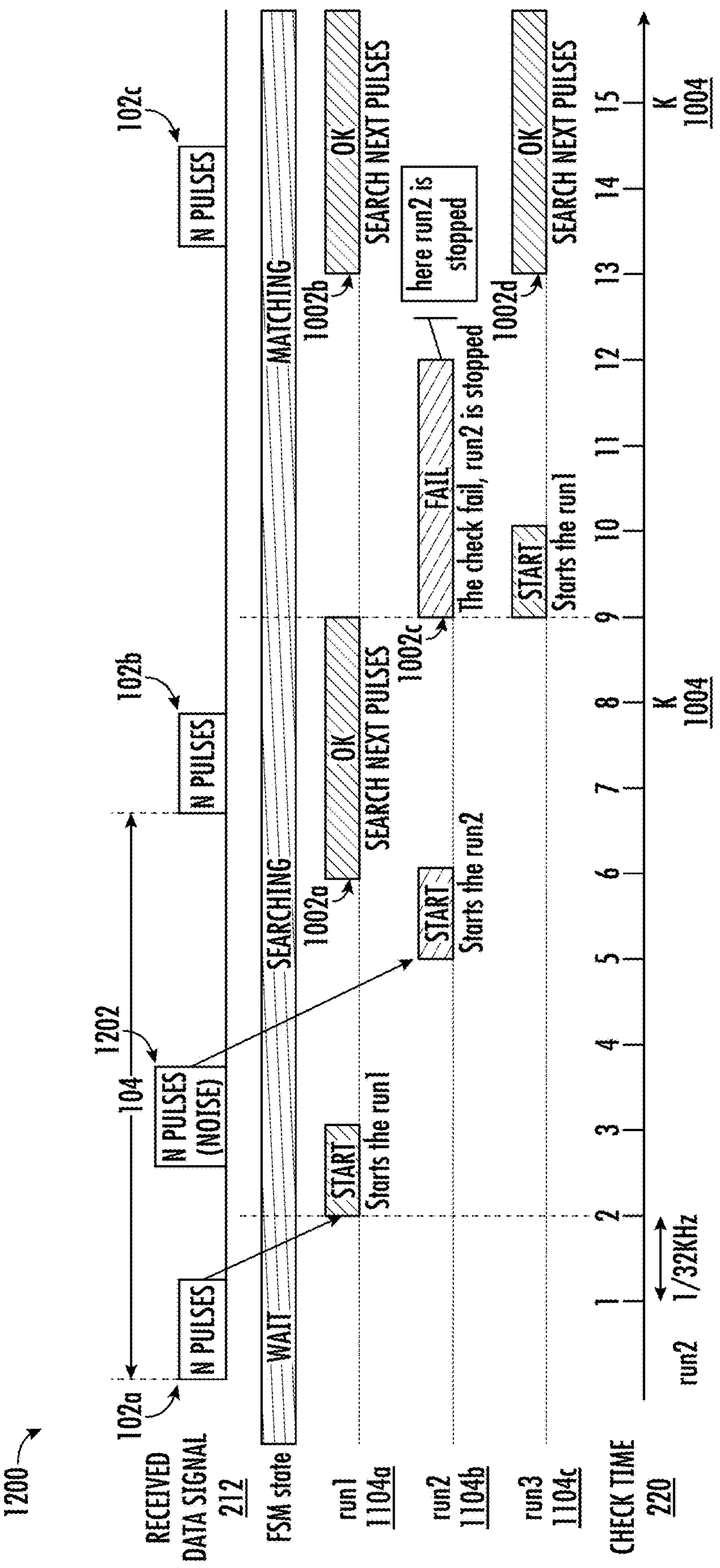
FIG. 12 illustrates an example signal diagram of parallel runs during wake-up pulse pattern detection in a received data signal comprising noise in accordance with an example embodiment of the present disclosure.

Referring now to FIG. 12, an example signal diagram 1200 depicting initiation of a plurality of parallel runs (e.g., parallel run 1104*a*, parallel run 1104*b*, parallel run 1104*c*) in the presence of noise pulses 1202 is provided.

As depicted in FIG. 12, a first wake-up pulse sequence 102*a* arrives on the received data signal 212. Reception of the first wake-up pulse sequence 102*a* triggers the initiation of the first parallel run 1104*a* and the calculation of the first next search period 1002*a* and the second next search period 1002*b* associated with the first parallel run 1104*a*. In addition, the state of the wake-up periodicity detection FSM is updated from the wait state to the search state.

As depicted in FIG. 12, in some environments, noise pulses 1202 may be received at the wake-up detection circuitry. The noise pulses 1202 may trigger the false detection of a wake-up pulse sequence and generation of a wake-up sequence match signal. The false detection of the noise pulses 1202 triggers the start of a second parallel run 1104*b* and the calculation of the first next search period 1002*c* associated with the second parallel run 1104*b*. Because the second parallel run 1104*b* was initiated based on the false detection of noise pulses 1202, the wake-up pulse sequence of parallel run 1104*b* is not repeated according to the repeat sequence period 104. Thus, no wake-up sequence match signal is detected during the next search period 1002*c*. Failure to detect the wake-up sequence match during the next search period 1002*c* causes the parallel run detection circuitry to transmit a parallel run schedule result signal 226 indicating a failure of the second parallel run 1104*b*. The second parallel run 1104*b* is ended and the resources utilized by the second parallel run freed.

The receipt of the second wake-up pulse sequence 102*b* while the first parallel run 1104*a* is in the search state triggers the start of a third parallel run 1104*c*. The parallel run detection circuitry determines a next search period 1002*d* associated with the third parallel run 1104*b* based on a check time. In an instance in which the first parallel run 1104*a* and second parallel run 1104*b* are not part of a valid wake-up pulse pattern. Identification of the wake-up pulse pattern may continue with the third parallel run 1104*c*.

Figure 13:
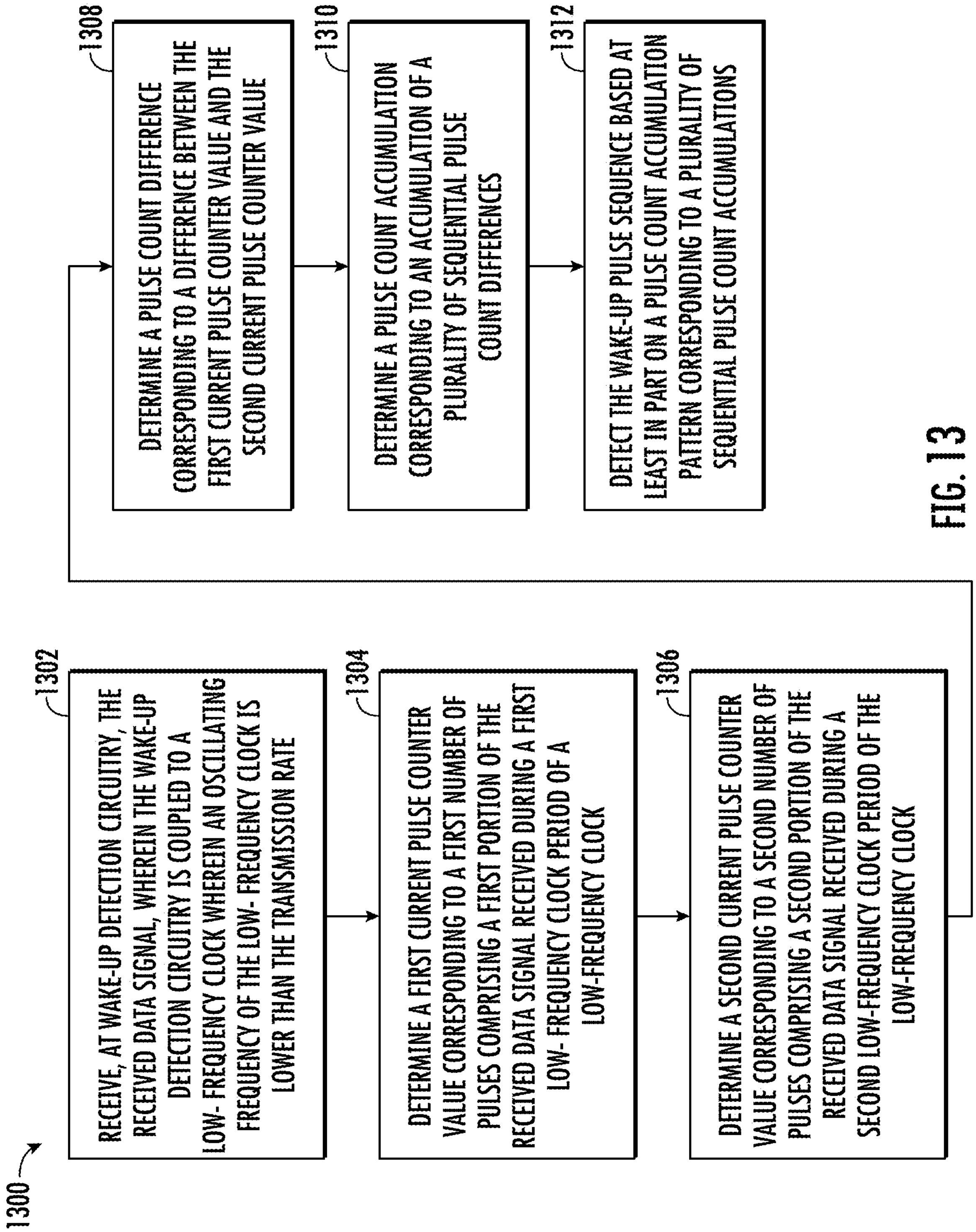
FIG. 13 depicts an example flowchart of a process for detecting a wake-up pulse pattern in a received data signal in accordance with an example embodiment of the present disclosure.

Referring now to FIG. 13, a process 1300 for detecting a wake-up pulse pattern (e.g., wake-up pulse pattern 100) in a received data signal (e.g., received data signal 212), the wake-up pulse pattern comprising a wake-up pulse sequence (e.g., wake-up pulse sequence 102) repeated according to a repeat sequence period (e.g., repeat sequence period 104) and transmitted at a transmission rate, is provided. At block 1302, the wake-up detection circuitry (e.g., wake-up detection circuitry 200) receives the received data signal, wherein the wake-up detection circuitry is coupled to a low-frequency clock (e.g., low-frequency clock 228) and wherein an oscillating frequency of the low-frequency clock is lower than the transmission rate. By operating the wake-up detection circuitry in synchronization with a low-frequency clock, the wake-up detection circuitry may consume less power during operations than in an instance in which a clock matching the transmission rate of the received data signal is used.

At block 1304, the wake-up detection circuitry determines a first current pulse counter value (e.g., pulse counter value 447) corresponding to a first number of pulses comprising a first portion of the received data signal received during a first low-frequency clock period of a low-frequency clock. With the wake-up detection circuitry operating in synchronization with a low-frequency clock having a frequency lower than the transmission rate of the received data signal, the wake-up detection circuitry may be configured to count the number of pulses within an oscillation period of the low-frequency clock. In an instance in which the pulse period (e.g., pulse period 106) is greater than the oscillation period of the low-frequency clock, a first portion of the wake-up pulse sequence may be received during the oscillation period of the low-frequency clock. The wake-up detection circuitry may be configured with one or more counters (e.g., wake-up pulse count searching circuitry 330 comprising pulse count circuitry 440) incrementing according to pulses received on the received data signal, to determine a pulse count associated with the first portion of the wake-up pulse sequence.

At block 1306, the wake-up detection circuitry determines a second current pulse counter value (e.g., pulse counter value 447) corresponding to a second number of pulses comprising a second portion of the received data signal received during a second low-frequency clock period of the low-frequency clock. The second current pulse counter value may additionally be determined by the one or more counters incrementing according to pulses received on the received data signal during the second portion of the wake-up pulse sequence.

At block 1308, the wake-up detection circuitry may determine a pulse count difference corresponding to a difference between the first current pulse counter value and the second current pulse counter value. In some embodiments, the first current pulse counter value may be stored in a register (e.g., register 443) and compared with the second pulse counter value. For example, a difference may be determined using an adder (e.g., adder 444).

At block 1310, the wake-up detection circuitry may determine a pulse count accumulation (e.g., pulse count accumulation 338) corresponding to an accumulation of a plurality of sequential pulse count differences. The pulse count accumulation may be configured to represent the accumulation of pulse counts over a pre-determined number of sequential low-frequency oscillation periods. In some embodiments, the pre-determined number of sequential low-frequency oscillation periods may be determined based on the pulse period and the low-frequency clock oscillation period. For example, the pre-determined number of sequential low-frequency oscillation periods may be determined based on the pre-determined number of sequential low-frequency oscillation periods required to cover the pulse period.

At block 1312, the wake-up detection circuitry may detect the wake-up pulse sequence based at least in part on a pulse count accumulation pattern (e.g., pulse count accumulation pattern 770) corresponding to a plurality of sequential pulse count accumulations. As described herein, a series of one or more pulse count accumulations may form a distinct pattern that may be detected by the wake-up pattern detection circuitry. For example, the series of one or more pulse count accumulations may form an approximately normal distribution with a peak value equaling the expected number of pulses during a full pulse period.

While this detailed description has set forth some embodiments of the present invention, the appended claims cover other embodiments of the present invention which differ from the described embodiments according to various modifications and improvements. For example, one skilled in the art may recognize that such principles may be applied to any electronic device configured to recognize a wake-up pulse pattern at low power. For example, a mobile phone, tablet, laptop, remote internet-of-things appliance, or other mobile device configured to enter a low-power or sleep state and further configured to exit the low-power or sleep state upon reception of a wake-up pulse pattern.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. Wake-up detection circuitry configured to detect a wake-up pulse pattern in a received data signal, the wake-up pulse pattern comprising a wake-up pulse sequence repeated according to a repeat sequence period and transmitted at a transmission rate, the wake-up detection circuitry comprising:

wake-up pattern detection circuitry, comprising:

wake-up pulse count searching circuitry coupled to a low-frequency clock wherein an oscillating frequency of the low-frequency clock is lower than the transmission rate, the wake-up pulse count searching circuitry configured to:

receive the received data signal; and determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock; and wake-up pattern compare circuitry coupled to the low-frequency clock, wherein the wake-up pattern compare circuitry is configured to:

detect the wake-up pulse sequence based at least in part on a pulse count accumulation pattern corresponding to a plurality of sequential pulse count accumulations.

2. The wake-up detection circuitry of claim 1, further comprising parallel run detection circuitry configured to:

receive a wake-up sequence match signal indicating a first wake-up pulse sequence has been detected by the wake-up pattern detection circuitry; and initiate a first parallel run, wherein initiating the first parallel run comprises:

determining a next search period corresponding to the repeat sequence period; and in an instance in which a second wake-up pulse sequence is received during the next search period, transmitting a wake-up signal match signal.

3. The wake-up detection circuitry of claim 2, wherein in an instance in which the first parallel run is initiated, and a potential wake-up sequence match is received outside of the next search period, a second parallel run is initiated.

4. The wake-up detection circuitry of claim 3, further comprising a wake-up periodicity detection finite state machine, wherein the wake-up periodicity detection finite state machine is configured to transmit the wake-up signal match signal in an instance in which the wake-up pulse pattern is detected.

5. The wake-up detection circuitry of claim 4, further comprising a parallel run scheduler, wherein the parallel run scheduler is configured to:

receive a parallel run enable signal from the wake-up periodicity detection finite state machine;

determine a number of parallel runs available; and transmit a parallel run scheduling request based on the number of parallel runs available.

6. The wake-up detection circuitry of claim 5, further comprising base period circuitry, wherein the base period circuitry is configured to determine a repeat sequence count correlating a number of periods of the low-frequency clock to the repeat sequence period.

7. The wake-up detection circuitry of claim 6, wherein a maximum number of parallel runs corresponds to the repeat sequence count.

8. The wake-up detection circuitry of claim 1, wherein the pulse count accumulation pattern corresponds to three or more sequential pulse count accumulations comprising at least:

a first sequential pulse count accumulation, a second sequential pulse count accumulation, and a third sequential pulse count accumulation, wherein the pulse count accumulation pattern comprises an approximately normal distribution.

9. The wake-up detection circuitry of claim 1, wherein the wake-up pulse count searching circuitry further comprises pulse count circuitry configured to:

receive the received data signal; and count a number of pulses in the received data signal.

10. The wake-up detection circuitry of claim 9, wherein the pulse count circuitry comprises a gray counter.

11. The wake-up detection circuitry of claim 9, wherein the wake-up pulse count searching circuitry further comprises count resync circuitry, configured to:

receive the low-frequency clock, wherein the low-frequency clock oscillates according to the low-frequency clock oscillation period; and determine at each low-frequency clock oscillation period, a resync count corresponding to the count of the number of pulses in the received data signal during the low-frequency clock oscillation period.

12. The wake-up detection circuitry of claim 11, wherein the wake-up pulse count searching circuitry further comprises count conversion circuitry, configured to convert the resync count into a binary-coded decimal value.

13. The wake-up detection circuitry of claim 1, wherein the plurality of sequential pulse counts comprises a sequential pulse count quantity and wherein the sequential pulse count quantity is determined based on a pulse period corresponding to a duration of the wake-up pulse sequence.

14. The wake-up detection circuitry of claim 13, wherein the sequential pulse count quantity is determined by dividing the pulse period by the low-frequency clock oscillation period, wherein the low-frequency clock oscillates according to the low-frequency clock oscillation period.

15. A wireless communication receiver configured to detect a wake-up pulse pattern in a received data signal, the wake-up pulse pattern comprising a wake-up pulse sequence repeated according to a repeat sequence period and transmitted at a transmission rate, the wireless communication receiver comprising:

wake-up detection circuitry comprising:

wake-up pattern detection circuitry, comprising:

wake-up pulse count searching circuitry coupled to a low-frequency clock wherein an oscillating frequency of the low-frequency clock is lower than the transmission rate, the wake-up pulse count searching circuitry configured to:

receive the received data signal; and determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock; and wake-up pattern compare circuitry coupled to the low-frequency clock, wherein the wake-up pattern compare circuitry is configured to:

detect the wake-up pulse sequence based at least in part on a pulse count accumulation pattern corresponding to a plurality of sequential pulse count accumulations.

16. The wireless communication receiver of claim 15, wherein the wireless communication receiver is configured to enter a low-power mode, and wherein the wake-up detection circuitry is enabled in an instance in which the wireless communication receiver enters the low-power mode.

17. The wireless communication receiver of claim 16, wherein the wake-up detection circuitry causes the wireless communication receiver to exit the low-power mode, in an instance in which the wake-up detection circuitry detects the wake-up pulse pattern.

18. The wireless communication receiver of claim 15, further comprising parallel run detection circuitry configured to:

receive a wake-up sequence match signal indicating a first wake-up pulse sequence has been detected by the wake-up pattern detection circuitry; and initiate a first parallel run, wherein initiating the first parallel run comprises:

determining a next search period corresponding to the repeat sequence period; and in an instance in which a second wake-up pulse sequence is received during the next search period, transmitting a wake-up signal match signal.

19. A method for detecting a wake-up pulse pattern in a received data signal, the wake-up pulse pattern comprising a wake-up pulse sequence repeated according to a repeat sequence period and transmitted at a transmission rate, the method comprising:

receiving, at wake-up detection circuitry, the received data signal, wherein the wake-up detection circuitry is coupled to a low-frequency clock, and wherein an oscillating frequency of the low-frequency clock is lower than the transmission rate;

determine a pulse count accumulation corresponding to an accumulation of a plurality of sequential pulse counts, wherein each pulse count in the plurality of sequential pulse counts corresponds to a number of pulses transmitted in the received data signal during a low-frequency clock oscillation period of the low-frequency clock; and detecting the wake-up pulse sequence based at least in part on a pulse count accumulation pattern corresponding to a plurality of sequential pulse count accumulations.

20. The method of claim 19, further comprising:

initiating a first parallel run upon detection of a first wake-up pulse sequence, wherein initiating the first parallel run comprises:

determining a next search period corresponding to the repeat sequence period; and in an instance in which a second wake-up pulse sequence is received during the next search period, transmitting a wake-up signal match signal; and initiating a second parallel run in an instance in which the first parallel run is initiated, and a potential wake-up sequence match is received outside of the next search period.

* * * * *